July 11, 1944. H. N. SMITH ET AL 2,353,197
METHOD OF AND MEANS FOR THE PRODUCTION OF KNITTING BY MECHANICAL MEANS
Filed Aug. 6, 1940 11 Sheets-Sheet 5
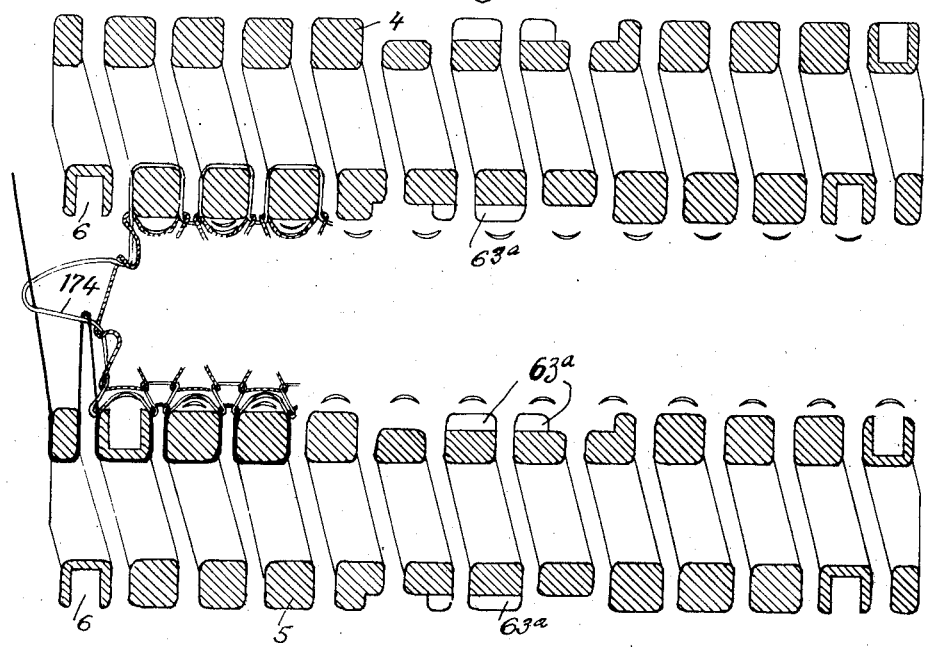
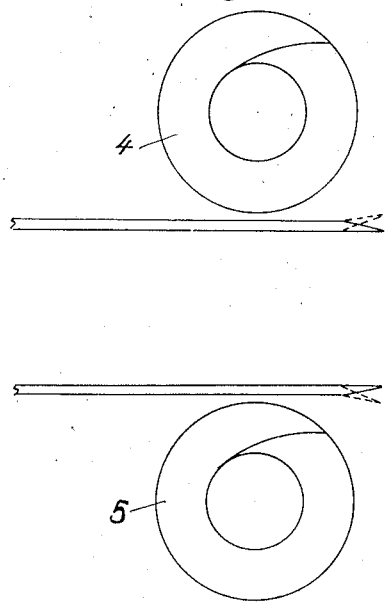
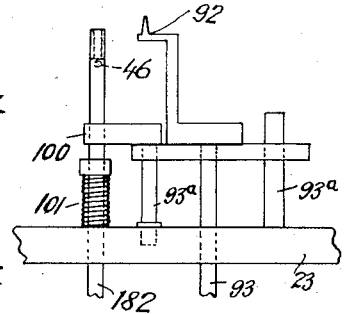
INVENTORS
Herbert Noel Smith
Elizabeth Ethel Smith
ATTORNEY
Albert F. Nathan INVENTORS
Herbert Noel Smith
Elizabeth Ethel Smith
ATTORNEY
Albert F. Nathan

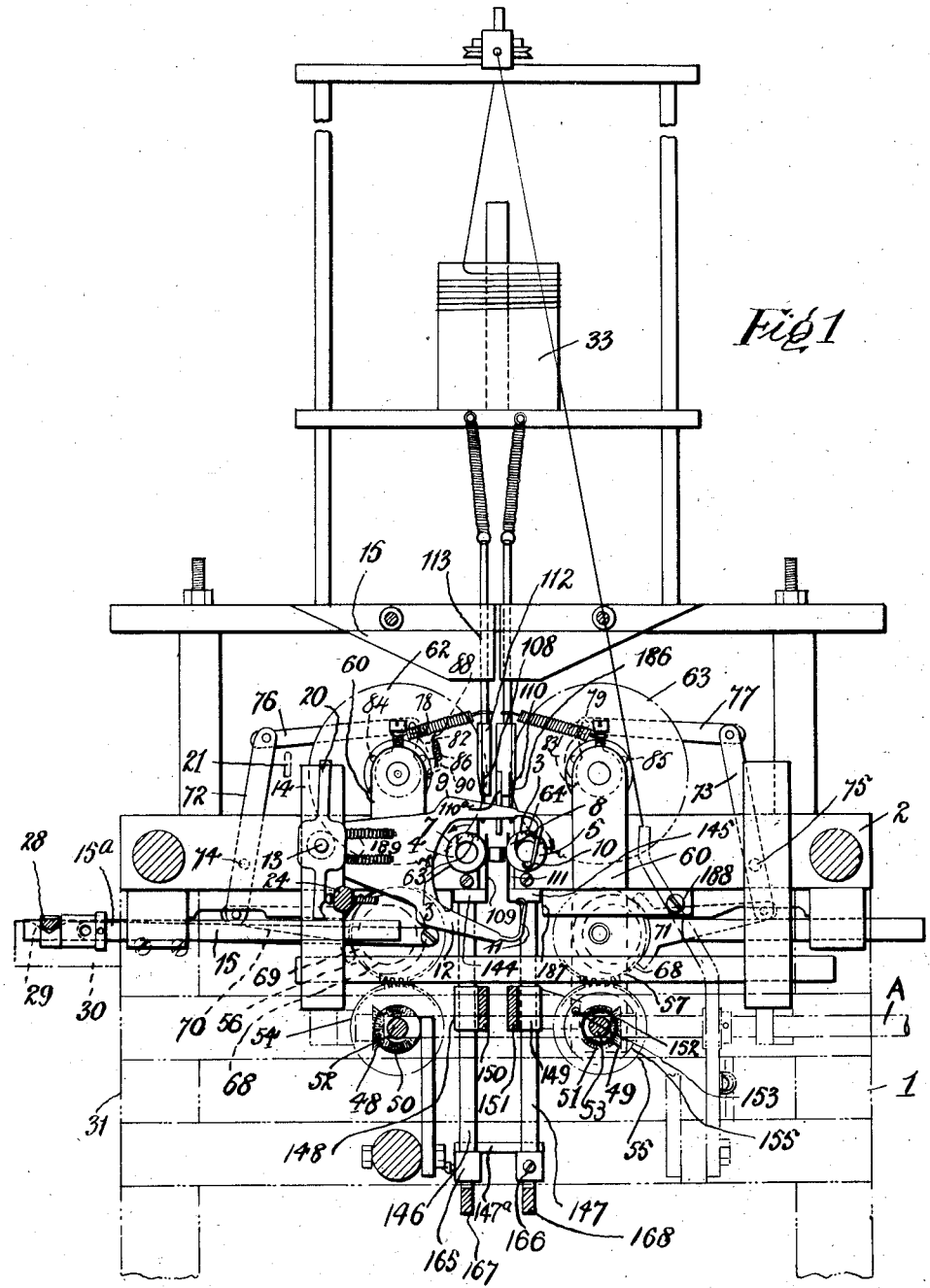

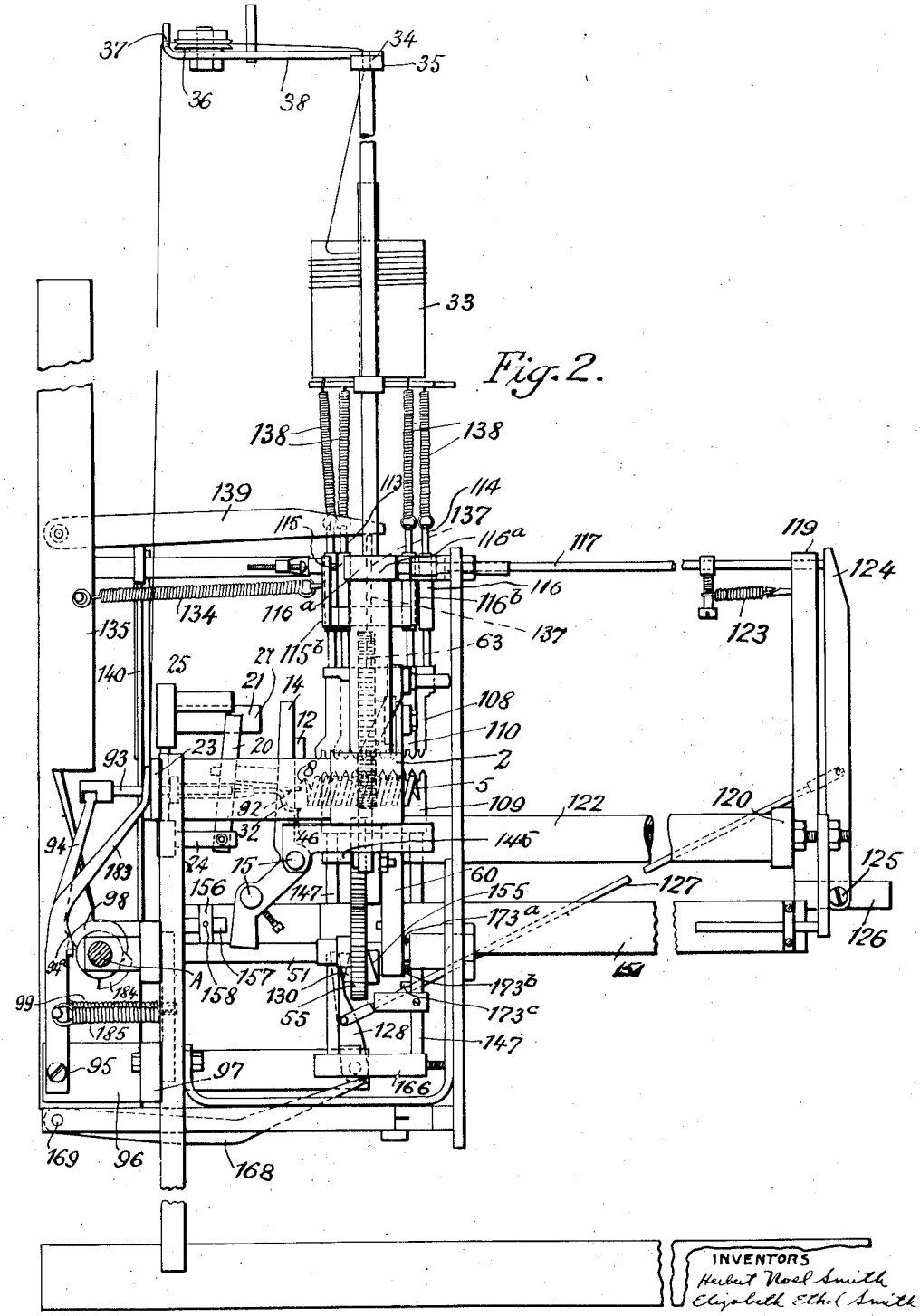

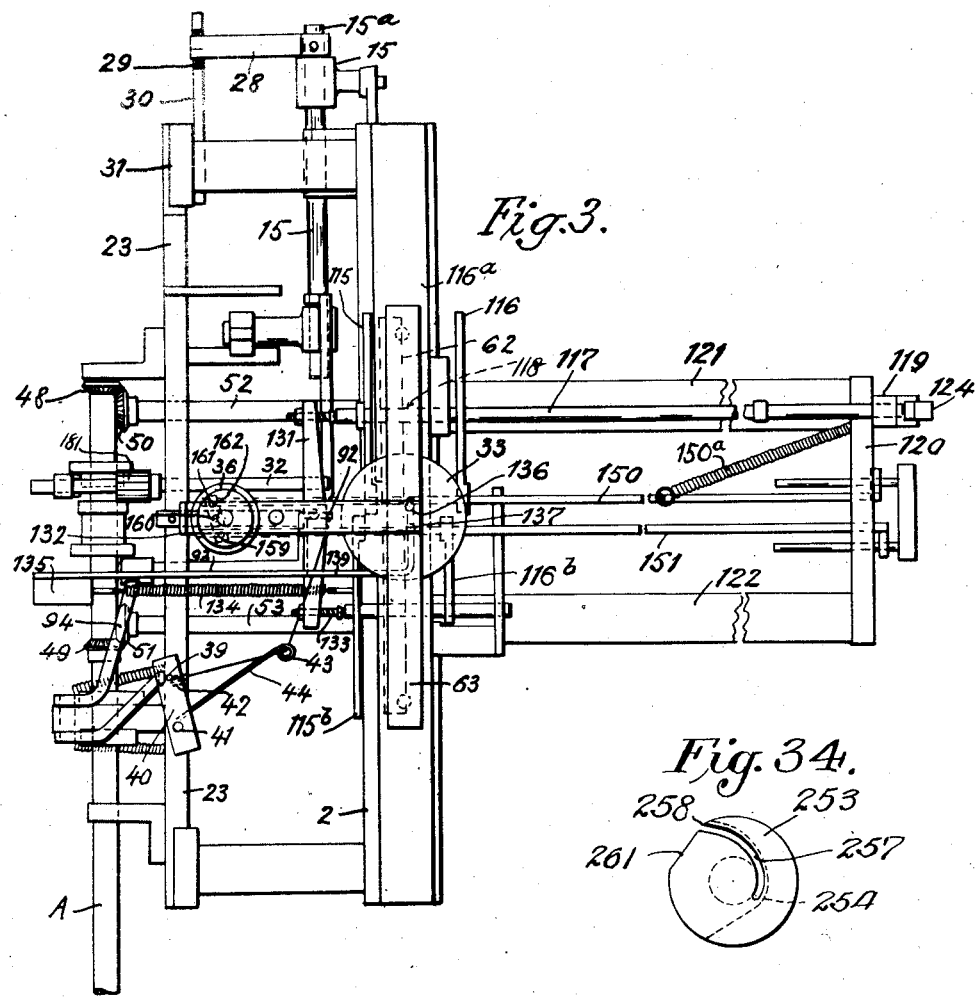
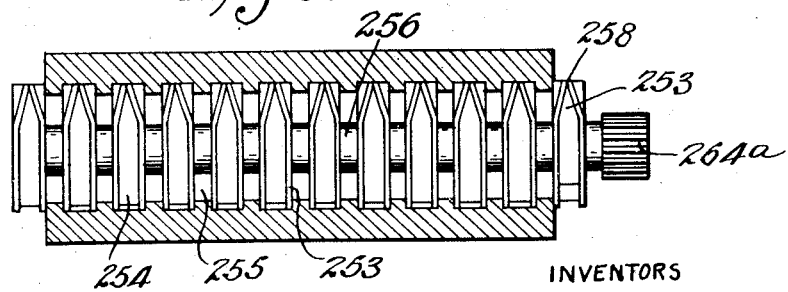

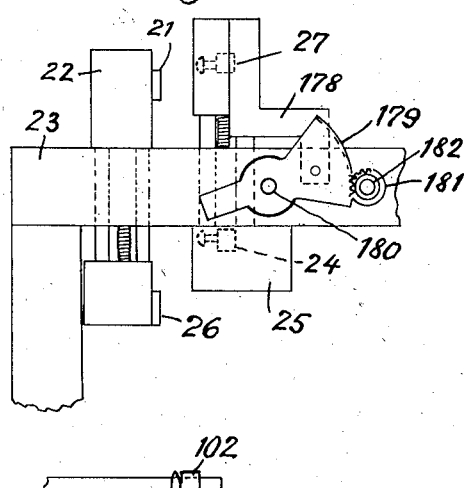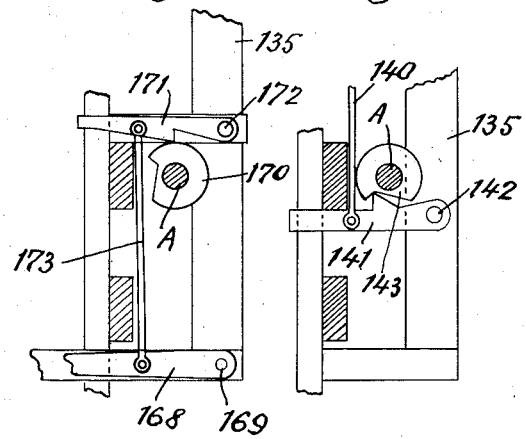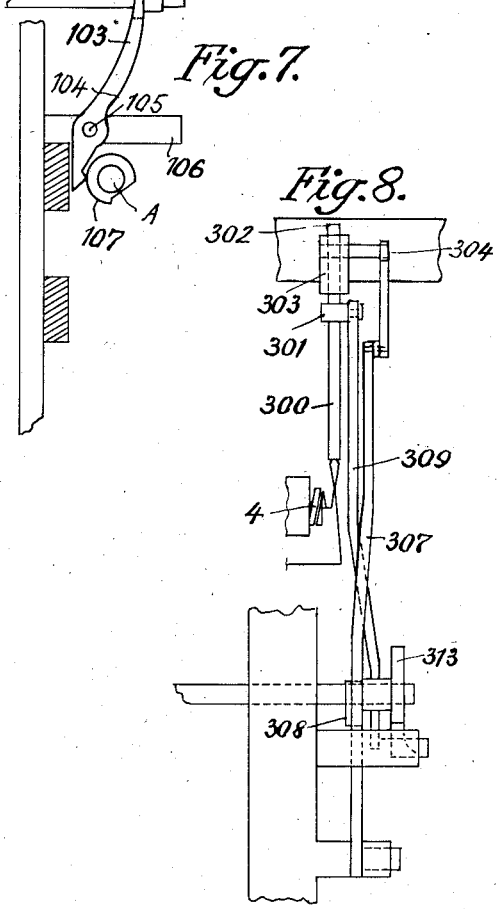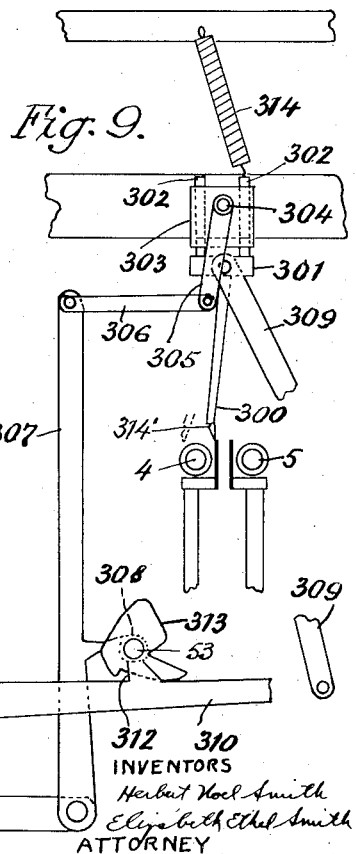

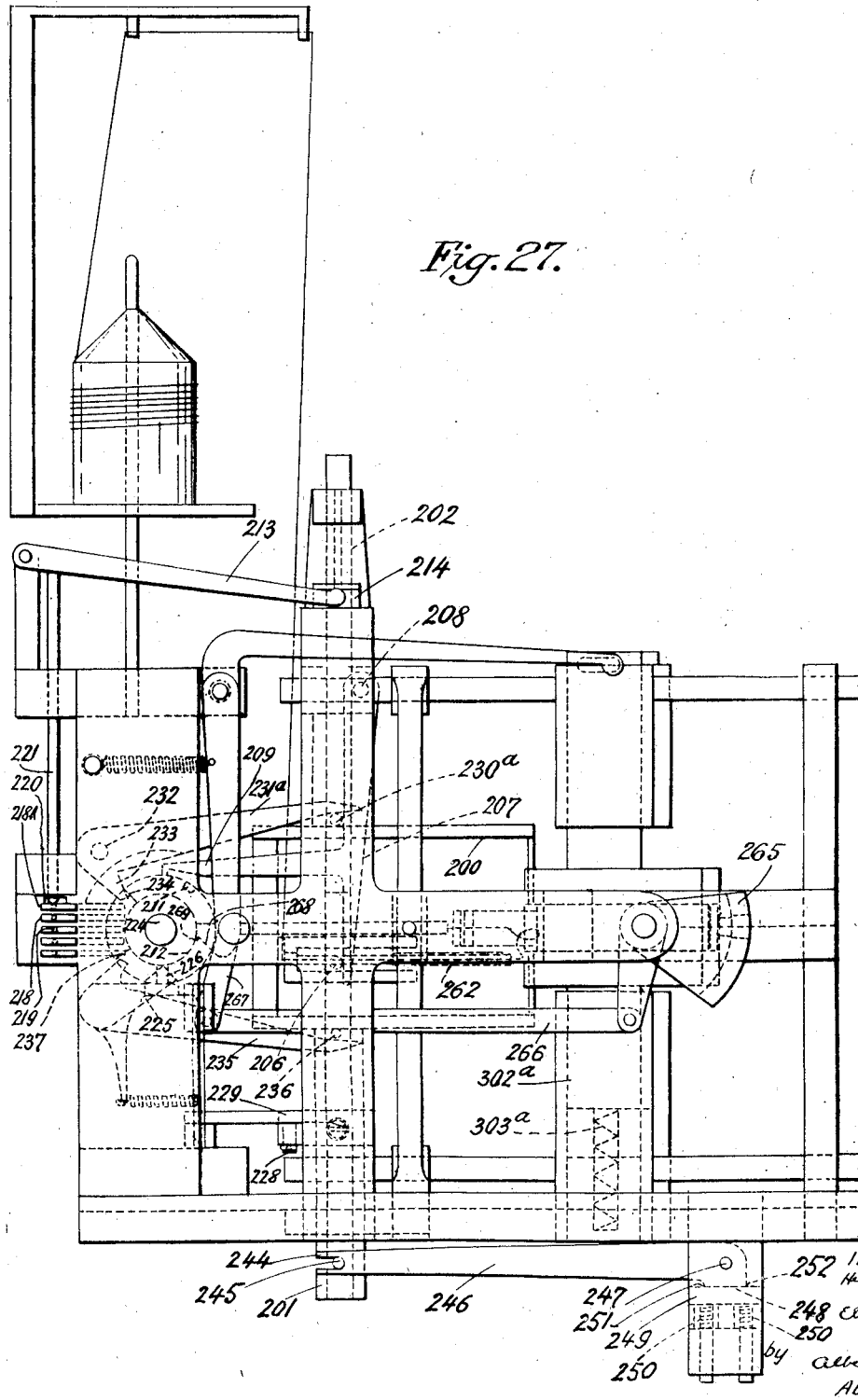

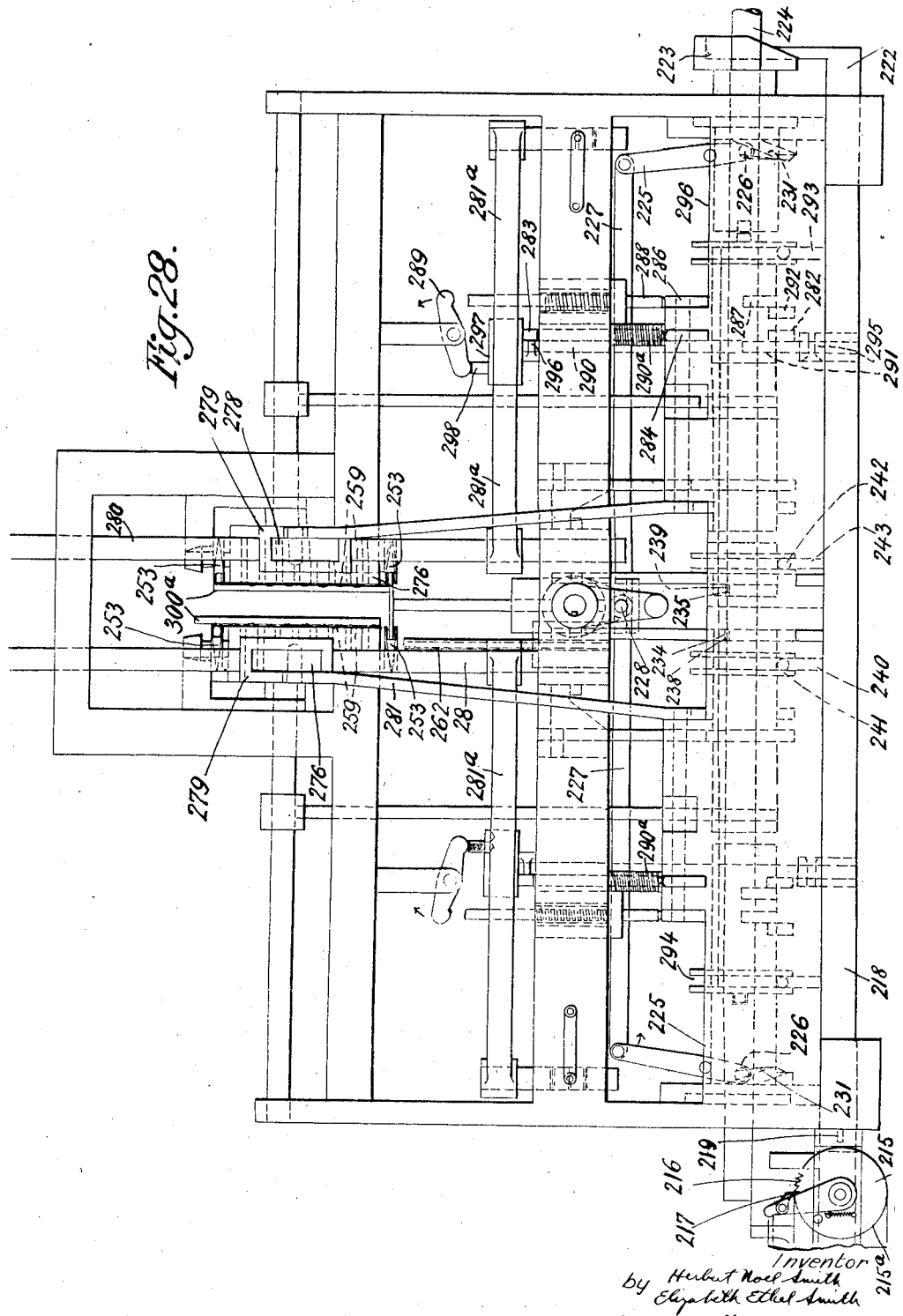

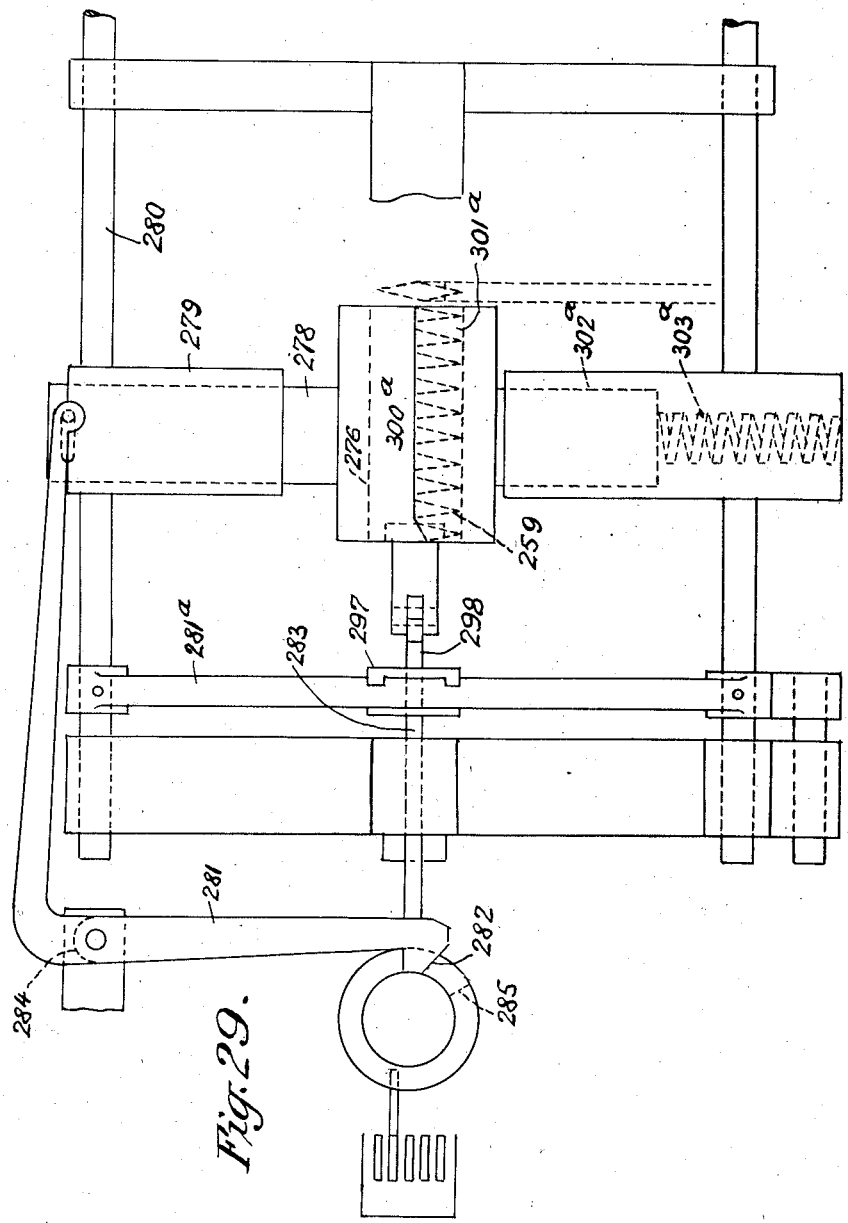

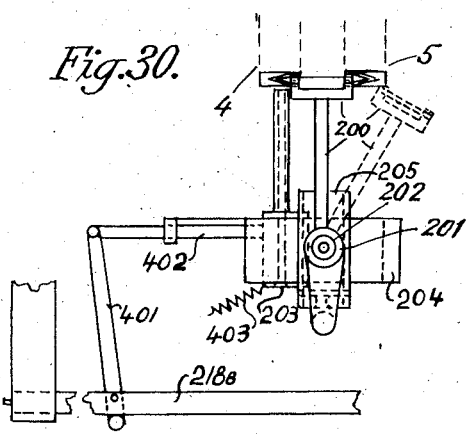

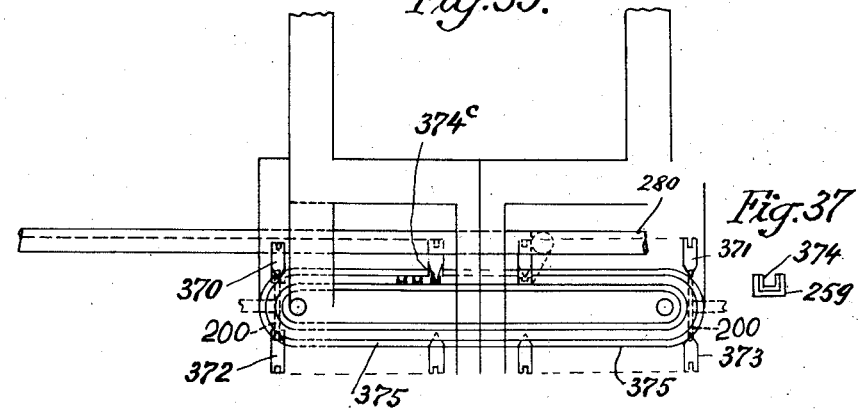
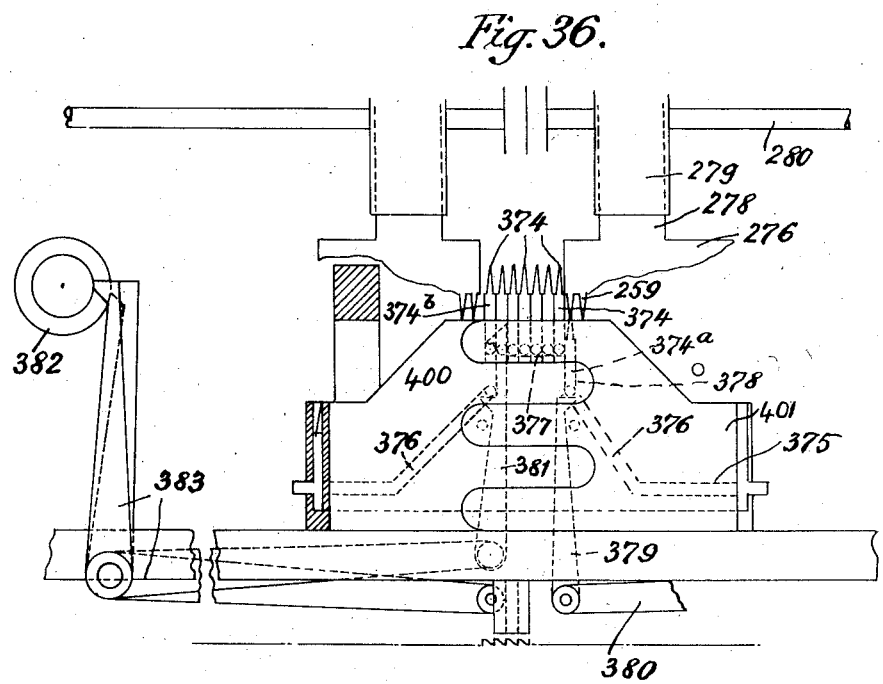

Patented July 11, 1944

2,353,197

UNITED STATES PATENT OFFICE 2,353,197

METHOD OF AND MEANS FOR THE PRODUCTION OF KNITTING BY MECHANICAL MEANS

Herbert Noel Smith and Elizabeth Ethel Smith, London, England

Application August 6, 1940, Serial No. 351,622
In Great Britain August 12, 1939

82 Claims. (Cl. 66—1)

The present invention relates to a new method of knitting and its application to mechanical so-called framework knitting wherein rows of a spiral series of stitches supporting each other are built from a continuous thread.

The usual forms of knitting machine employ bearded or latch needles which provide a hook or beard for the thread; the bearded or latch end of the needle being arranged to cam its way through a previously formed stitch when carrying the new stitch therethrough, the closing of the beard or latch forming an eye, i. e., that end of the needle is so shaped that provided the closure of the eye is satisfactorily performed after the thread has been engaged the needle can pass safely through the old stitch without catching the thread thereof.

We depart from this usual mode of forming the stitches by providing a means to hold open an already formed stitch and guard it from the stitch-forming means while the latter is taking the new loop through the old stitch to form another stitch. The necessity for an eyed part to be opened and closed and which, when closed, shall have a smooth exterior to enable it to move through the stitch without catching the thread is thus no longer essential; in fact we can, and preferably do, omit altogether an eye which has to be opened and closed in favour of a stitch-forming member which is laterally open and, as distinguished from the beard or latch, remains so when passing through the stitch, and, as distinguished from an eye which is permanently closed, allows the thread to be laid in it instead of requiring to be threaded through it. We would have it understood that our claims do not include any form in which the thread must be threaded through a permanently closed eye of a stitch former. It has been proposed to knit with such an eyed needle across the two ends of a horse-shoe shaped helix, sliding the needle back and forth along the thread in the course of forming the new loop and taking and leaving this on a point of the helix. This involves subjecting a length of thread sufficient for several loops to a harsh wearing action during the formation of each stitch and the threads usually employed for knitting, and especially the more delicate threads, would be seriously worn by this action.

On the contrary, we regard it as essential that the stitch-forming means, should be so constructed and arranged as to form each of successive stitches by first engaging the thread and then carrying the loop of the new stitch through the old stitch while the latter is held open and guarded. To provide the required guard involves at least one part of open structure around which the stitch is held, and a part of channel shape serves particularly well since it holds open the stitch satisfactorily with a three-wall guard and gives the necessary passage for the stitch-forming means. Other open structures are however available for the purpose, e. g., a slotted form such as would be made by omitting the bottom of the channel and leaving two spaced opposite walls.

The invention also rules out the necessity for keeping the stitch-forming member, to wit, the bearded or latch needle in the case of the usual machines, always in one or other of the stitches and therefore it becomes readily practicable to pass the stitch-former selectively in either direction through the guard around which the old stitch is held open so that the so-called plain and purl stitches can be knitted at will.

It is the usual practice in mechanical knitting to use one bearded or latch needle to each stitch in the width of the fabric, i. e., a new stitch is formed simultaneously through each previous stitch of the series across the width of the fabric when flat knitting or around the circumference thereof in the case of tubular knitting; it is a further feature of this invention that the same stitch-former may form the new stitches through the stitches of the said series successively. In the mode of successive knitting, we do not necessarily knit only one new stitch at a time; on the contrary, it is better to knit at two positions at the same time as the speed of knitting is in this way multiplied, but in this method of knitting there will always be stitches which are awaiting their turn to receive a new loop while knitting progresses. The first series of stitches may be produced by hand. One knitting position may be a replica of the other. This method of knitting may be likened to hand-knitting, but there is no manoeuvring of one needle into an unguarded stitch on another. This hand movement would be difficult, if not impossible to reproduce mechanically, but the formation of the stitches by succession allowed by our invention enables us, at least in some degree, to produce mechanically the variety of stitch-formation which makes hand-knitting for this purpose so far superior to existing machine knitting.

We find it more convenient to carry out the two operations of the stitch-former, viz., the engaging the the thread and the carrying through the guard of the new loop, by first passing the stitch-former through the guard and the stitch therearound in one direction before the thread is engaged and then drawing the new loop through the guard by a return movement of the stitch-former therethrough; this drawing of the loop is of considerable advantage since the loop is left almost free to receive or to be deposited onto the loop-accepting member and, moreover, as the stitch-former does not then have to return through the old stitch after releasing the stitch just formed the old stitch can be cast off the guard sooner, and an opportunity is provided for some opening out of the loop to facilitate its acceptance by the accepting point.

A laterally open form of stich-former which satisfactorily serves this purpose and which we find is of great practical value in our preferred forms of machine is one of open hook form. It is preferred so to arrange the hook that its free end faces a wall of the guard, e. g., the bottom of the channel, so that there is still less likelihood of the hook catching the thread of the stitch.

Another advantageous feature of our invention is a novel form of thread-layer to co-operate with the stitch-forming means. This may be movable, e. g., slidable, or rotatable through a half-circle, so as to lay the thread satisfactorily in whichever direction the stitch-former is to pass through the stitch around the guard, and where the machine is constructed for flat knitting and the direction of flow of the knitting is periodically reversed, the thread-layer may be displaceable to co-operate with the stitch-forming means in whichever direction the knitting is progressing. The machine may be readily constructed so as to knit flat and plain and purl at will, in which case the same thread-layer may be displaceable in two senses, the one to conform to the direction of knitting and the other to the direction of entry of the stitch-former into the guard. The thread-layer may be arranged to move and open out the loop after it has been engaged by the stitch-former in order to facilitate the entry of the accepting member thereinto.

For the purpose of knitting plain and purl selectively, the stitch-forming means may comprise two actual stitch-forming elements, in the preferred form two hook members, the carrier therefor preferably being oscillatable and the two members so arranged that one passes through the guard in one direction without interference by the other, which latter, when required, will pass through the guard in the reversed direction whilst the former member is out of action. Two members may also be provided in a machine adapted for flat knitting, the one to operate in one direction of flow of the knitting and the other to come into use in the other direction of flow and where both flat knitting and selective plain and purl is required, four such members may be employed or the same two members may be made to operate in either direction of flow.

In the forms of the invention hereinafter chosen for illustration the guard member and the new loop-accepting member are arranged to carry a row of stitches. In that case one member may have a guard part at the front end and a loop-accepting point at the rear and the other member and accepting point at the front and a guard at the rear and in a simple form of the machine a transfer device may be arranged to carry the stitches across from the rear of the accepting member onto the rear of the guard member. Alternatively the stitches may be knitted across at the rear end. These forms will produce tubular knitting. If desired a guard and an accepting point may be formed at each end of each member so that the flow can be reversed, for flat knitting. In the one case illustrated these members are intermittently-rotatable helices, the number of stitches carried by each member depending on the number of convolutions in the helix and the guard being formed by channeling or slotting the outer surface of the helix. In the second case illustrated each member is in the form of an oscillatable comb with a series of curved prongs at least one of one member being peripherally channeled or slotted to form a guard and at least one of the other members being arranged to receive the new loop, and the combs may be channeled and pointed to form tubular or flat knitting as in the helical form. All the prongs of each member are preferably channeled for the reason hereinafter described. The stitch-former is arranged to pass substantially tangentially through the peripheral channel. When such combs are used, means must be provided to advance the stitches, such as a series of members of channel or arched-blade form which can lie in a channel in each prong and engage the stitches whilst on the prongs. Such members intermittently advance the stitches, after the prongs have turned and detached themselves from the stitches to such an extent that the prongs may each return and engage the next stitch. Nipping plates or bars may be provided for holding the stitches, especially when the prongs are to recede therefrom. Even with the helical form it is desirable to use a similar means since, the helix cannot usually be wholly relied upon satisfactorily to advance the stitches and there is a tendency for the fabric to roll up on the helix when these parts turn. The blades may be like the prongs of a comb, and if desired, two combs may be used, the blades of which enter the stitches from opposite directions and hold the row of stitches firmly between them.

Although we have referred to using a rotary or oscillating curved guard member, this is by no means essential for achieving the objects of our invention, since a straight guard member may be employed which can recede out of the old stitch and take up another. A suitable means for doing this is described subsequently in connection with one of the forms of machine herein illustrated.

When it is not desired that the machine should produce other than a standard article with the same number of stitches across its width or around its circumference the form of machine with row-carrying guard and accepting members and a direct transfer or second knitting station at the rear end suffices, but to make the machine adaptable to different widths or circumferences of fabric we prefer to introduce a series of separate stitch-conveying members, the number of which at any time to be in operation can be varied. When such members are used it is no longer necessary to carry a row of stitches on the guard member or on the accepting member; e. g., the guard member may be a single channeled curved prong and the accepting member a single curved prong.

We prefer to make these separate stitch-conveying members of stick-like form standing one next to the other and arranged to travel round a track, these members feeding round the stitches of the upper row of the flat fabric or of the circumferential (or, more exactly, the spiral) upper series of the tubular fabric to receive the new stitches successively. An endless series of such conveying members may be provided and the required number selected for use according to the width or circumference of the fabric to be knitted. The members are raised into or lowered out of the stitches in proper order.

As the stitches around these members have eventually to be penetrated, it is very desirable to make such members also in channel or other stitch-guarding form.

To achieve an automatic change in the direction of entry of the stitch-former through the guard and the stitch thereabout, a jacquarding mechanism is hereinafter described, and this may be arranged, through appropriate connections, e. g., mechanical, to control the operation of the stitch-former. For example this mechanism may include a travelling perforated band, disc, drum or the like and pegs or pins arranged to pass through the band when the holes register therewith, the pins being operatively coupled to the mechanism involved in the variation of the loop formation. By way of example, one pin could be used for shifting the thread layer and taking one looper hook out of operation and putting the other into operation for changing over from plain to purl, but pins for other purposes may be provided, e. g., abreast pins and to co-operate with a corresponding number of rows of longitudinal holes along the jacquard band, the holes being appropriately irregular spaced in accordance with the predetermined pattern of the garment or the like to be produced.

It is advantageous to provide a braking device for maintaining the thread under tension except when the loop is being formed, at which time the brake is released.

A presser device may be employed to move down and hold down the fabric and another presser may be employed which moves at right angles to the general plane in which the stitch former moves.

Where helical members are employed, they are given a half-turn prior to reversing the knitting flow for flat knitting, the blades being moved to a corresponding amount axially of the helical members.

Two forms of machine of a type employing rotary or oscillating guard members are illustrated by way of example only in the accompanying drawings, in which—

Fig. 1 is a front elevation; Fig. 2 a side elevation and Fig. 3 a plan view of one form of machine.

Figs. 4 to 10 are detail views of parts of the machine.

Fig. 11 is an enlarged view of the two helical needles showing the loop formation and Fig. 12 an end view thereof.

Fig. 27 is a diagrammatic end view and Fig. 28 a diagrammatic plan view of another form of machine according to the invention.

Figure 13:
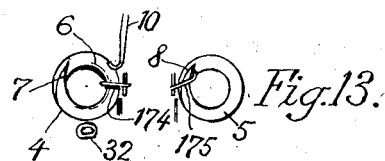
Figs. 13 to 26 show the cycle of operations of the needles for each loop formed.

Fig. 29 is a fragmentary end view thereof. Figs. 30 to 32 are detail views of the looper mechanism of this machine. Figs. 33 and 34 are longitudinal sectional views and end views respectively of one of the needles used in this machine.

Figs. 35 to 37 are views of another feature of the invention.

The machine illustrated in Figs. 1 to 26 comprises a framework 1 including a main cross bar 2 which forms part cylindrical bearings 3 for rotary helical members 4 and 5. One or both of the members is provided with a stitch guard formed by a longitudinal channel 6 formed along the end convolution of the helix. The end of each member is tapered away both longitudinally and in its thickness to a flat blade-like pointed end 7, 8. Associated with the helical members is a looping or stitch-forming device 9 which for the purpose hereinafter explained comprises two open-hook loopers 10 and 11. The frame 12 carrying the loopers is pivotally mounted at 13 on an upright member 14 of a slidable carriage 15, the rod members of which are slidable in guides attached to the bar 2 of the framework. Fixed on the axle 13 of the looper frame 12 is a two armed lever 20, one arm being arranged to co-operate with a stop 21 projecting inwardly from a vertical slide 22 (see Fig. 4) movable in another cross bar 23 of the framework and the other arm is arranged to contact periodically with an inward projection 24 of another slide 25 which is movable vertically in guide passages in the same cross bar 23. These slides are movable the one up and the other down in order to remove the stops 21 and 24 out of the path of the lever 20 and to bring into position further stops 26 and 27 which enable the looper to rock in the reverse direction as hereinafter explained. Attached to the rod 15a of the carriage 15 is an arm 28 which during the reciprocation of the carriage is arranged periodically to rock the carriage by means of a fixed V-shaped cam 29 formed in a bar 30 projecting from one of the main standards 31 of the machine framework.

The yarn is supplied to a yarn or thread layer 32 from a spool 33 by way of a passage 34 in an upper cross bar 35 of the machine framework and round a cymbal tension device 36, a hole 37 in the bar 38 fixed on said upper bar 35 and thence through a hole 39 (see Fig. 3) in an arm 40 pivoted at 41 onto the cross bar 23 of the machine framework, the yarn passing through a hole 42 in the latter bar thence through an eye 43 of a rod 44 projecting from said cross bar to an under opening 45 (see Fig. 14) in the flattened hollow end 46 of the yarn layer and then out of the mouth of the hollow end of the layer to a point adjacent the guard where it can be engaged by the looper.

The helical members are arranged to be periodically rotated and for this purpose on the main shaft A of the machine are two bevel wheels 48, 49 co-operating with bevel wheels 50, 51 on shafts 52, 53 which are at right angles to the main shaft and each carry a spur wheel 54, 55 which meshes with another spur wheel 56, 57 mounted in bearings in brackets 60 secured to the main cross bar 2 of the machine frame. Two further large spur wheels 62, 63 mounted in these brackets engage with spur teeth 63a cut in the outer periphery of the helical members (see Figs. 1 and 11). The members are given one relatively quick complete rotation for each turn of the main shaft. The slow progressive rotary motion of the large spur wheels is derived through a pawl and ratchet mechanism from the spur wheels 56 and 57. For this purpose each of the latter wheels is provided with an eccentric 68, the sheath 69 of which is carried by an arm 70, 71 to which is pivoted a lever 72, 73 fulcrumed at 74, 75 respectively to the cross bar 2 the upper arm of each lever being pivoted to a substantially horizontal arm 76, 77 which is pivoted to a crank 78, 79 mounted to rock about the axes of the large spur wheels, the axle pin of each of such cranks pivotally carrying a pawl 82, 83 which engages with a ratchet 84, 85 each formed by a circumferential series of spaced pins. Each pawl is urged into engagement with the ratchet by a spring 86 attached to a lug 88 on the pawl on the one hand and to an arm or crank 90 rotatable about the wheel axes on the other hand.

For holding the upper circle of stitches firm during the formation of the new loop a presser device 92 is provided which is slidable in a direction parallel to the axes of the helical members and into the space therebetween, the presser bar being carried by a slidable rod 93 which carries (see Fig. 10) a block co-operating with two guide rods 93a extending towards the helical members from the upper cross bar 23 of the frame and being pivoted to a lever 94 fulcrumed at 95 on a bracket 96 extending from a lower cross bar 97 of the machine frame, the lever 94 having a V-shaped protuberance 94a which is positioned so as to be engaged by a cam 98 on the main shaft whereby through the lever 94 the presser device is periodically given a motion of withdrawal against a spring 99 which is attached to the lever on the one hand and anchored at the other end to a suitable part of the frame and normally urging the presser device into its operative position. The yarn layer is also subjected to a reciprocatory movement parallel to the axes of the needles to bring the cranked hollow mouthpiece into a position to lay the yarn in the path of the looper and for this purpose it is slidably mounted in the aforesaid cross bar 23 of the machine frame on the one hand and in a guideway formed by a block 100 (see Fig. 10) on the end of the adjacent guide rod 93a which projects from such crossbar on the other hand. A compression spring 101 normally tends to urge the yarn layer into a position in which the hollow mouthpiece underlies the channel in the helical member but a collar 102 is provided (see Fig. 7) in the rear end of the yarn layer engaged by a forked end 103 of a two armed lever 104 which is fulcrumed at 105 to a bracket 106 on the machine framework and is engaged by a cam 107 mounted on the main shaft and which has a fall away part which periodically enables the forked end of the lever to be thrown forwards under the urge of the compression spring 101 at the same time as the yarn layer is carried into yarn laying position.

The gearing previously described for rotating the helical members causes them to turn in opposite directions so that the new stitches formed on the accepting member are carried along the corresponding helix in one direction and these stitches, transferred from the accepting member back onto the guard member by a transfer member hereinafter to be described, are carried along the guard member 4 in the reverse direction until each new stitch in turn reaches a position to embrace the channelled end convolution of such member, there to receive the new stitch, and subsequently be cast off. This progressive endless motion of the stitches is however facilitated by the provision of a series of stitch engaging pointed elements (hereinafter referred to as the blades) which serve to receive the stitches between them to prevent undue rise and fall of the fabric and also by receiving a motion synchronized with that of the helical members to aid in advancing the stitches along such members. There are four series of blades, viz., the one series formed by the upper comb 108, another by the lower comb 109, both co-operating with the loops adjacent the guard member and a second pair of combs 110 (upper comb) and 111 (lower comb) which co-operate with the stitches adjacent the accepting member. These combs have to be periodically advanced while all in the stitches, the pair 108 and 109 travelling in one direction and the other pair travelling in the other direction, and they must be also periodically withdrawn from the stitches by an upward or downward motion, returned again into their original position by movement parallel to the axis of the helical member and then again brought through the stitches. In order that the upper pair of combs 108 and 110 shall have such a reciprocatory motion the comb 108 is attached to a bar 112 carrying two upstanding rods 113, 114 to which are attached spaced cheek plates 115, 116 fixed to a long rod 117 which is guided at one end through a passage 118 in the upper cross bar 116a of the framework of the machine and is guided at the other end in an upstanding bracket 119 attached to a cross bar 120 which is supported by cantilever rods 121, 122 attached to the aforesaid brackets 60 on the main cross bar 2 of the machine framework. A spring 123 normally urges the rod 117 rearwardly, that is to say, against the upper end of a lever 124 pivoted at 125 to a bracket 126 on the fixed frame extension and to this lever is pivoted a long rod 127 which is in turn pivoted to a lever 128 whose free end is engaged by a face cam 130 secured to the lower spur wheel 55. Through this means the lever 124 periodically shifts the rod 117 and the cheek plates 115, and 116 towards the front of the machine and thereby advances the comb in the same direction, the amount of advance being co-ordinated with the pitch of the helix so that the combs travel in synchronism therewith. The other upper comb 110 has simultaneously to receive a longitudinal movement in the reverse direction and it does so by causing the long rod 117 when urged forwards to rotate a lever 131 fulcrumed on a fixed bracket 132 whereby the other arm of that lever through the medium of the projecting screw 133 imparts a rearward movement to the cheek plates 115b and 116b attached to the upper comb 110, this movement being effective against the action of a spring 134 attached to the cheek plate 115b on the one hand and to a fixed upstanding standard 135 of the framework on the other. This spring normally tends to pull the comb 110 towards the front of the machine. The downward movement of the two upper combs is effected through the medium of two vertical rods 136, 137, one to each comb, the upper ends of which project through the cross bar 116a of the machine frame and are normally urged upwards by the springs 138 against the free end of a lever 139 which is pivoted to the aforesaid standard 135. To the lever 139 is pivoted a rod 140, the lower end of which is pivoted to a lever 141 (see Fig. 6) fulcrumed at 142 to the standard 135 and having a shallow V-shaped upper surface arranged to co-operate with a cam 143 secured to the main shaft A of the machine and through the medium of which the lever 139 is made periodically to depress both top combs simultaneously.

The opposite reciprocatory motion of the lower combs is derived by securing these combs to bars 144, 145 from which depend pairs of rods 146, 147 which are fixed to blocks 148, 149 attached to the long bars 150, 151. The block 149 of the bar 151 has a lateral projection 152 to which is attached a pin 153 which co-operates with a face cam 155 attached to the rear face of the lower gear wheel 55 so that during each turn of the latter wheel the bar 151 is displaced rearwardly. To the forward end of such bar a lateral projection 156 is secured which serves to cooperate with a fixed pin 157 which assists in guiding the bar and which projection also carries an upwardly extending pin 158 over which one end of a lever 159 is loosely mounted, the latter lever being fulcrumed at 160 and having a second arm 161 similarly engaged over a pin 162 extending upwardly from a lateral projection on the other bar 150. Therefore when the cam urges the bar 151 rearwards motion in the opposite direction is transmitted through the lever 159 to the companion bar 150 against the force of the returning spring 150a. The lower points are given their upward movement by extending the aforesaid rods 146, 147 below the bars 148 and 149 and attaching them to two further bars 165, 166 which are simultaneously engaged by the two prongs 167, 168 of a bifurcated lever fulcrumed at 169 to the standard 135 and arranged to be periodically raised by the action of a cam 170 (see Fig. 5) on the main shaft A lifting a dever 171 fulcrumed at 172 to a fixed part of the frame and attached by a vertical rod 173 to the bifurcated lever. The downward motion of the lower combs may be effected by spring action or this motion may be effected by a cam 173a on shaft 52 rocking a lever 173b which is pivoted to the bottom of bracket 60 (see Fig. 2) the free end of the lever acting on a lug 173c attached to the rear one of the pair of rods 147 on which is mounted an arm 147a which simultaneously depresses the companion bar 146.

Figure 21:
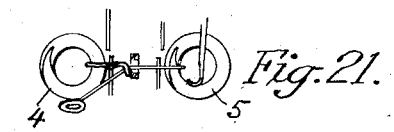
Figure 14:
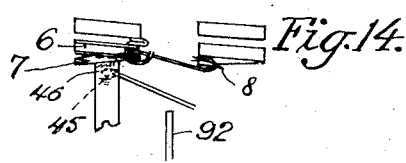
Figure 22:
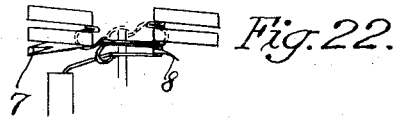
Figure 15:
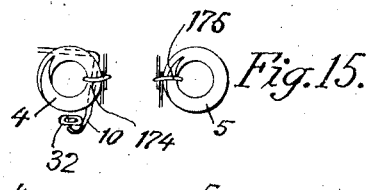
Figure 23:
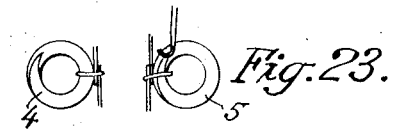
Figure 16:
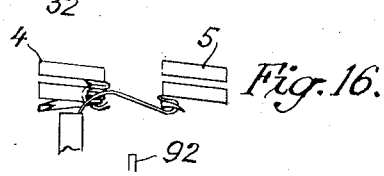
Figure 24:
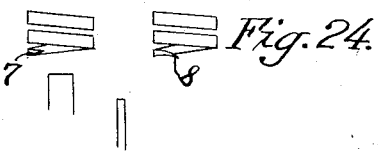
Figure 17:
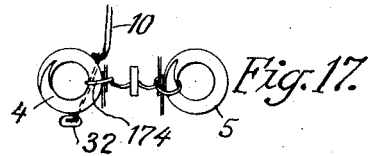
Figure 25:
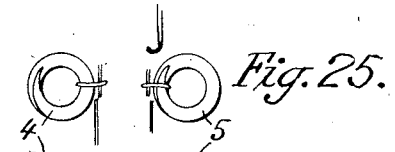
Figure 18:
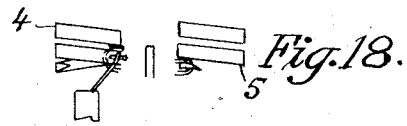
Figure 26:
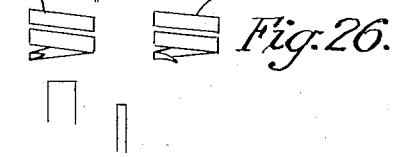
Figure 19:
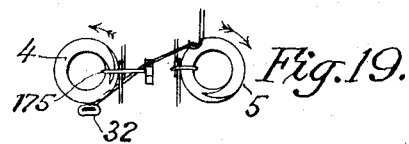
Figure 20:
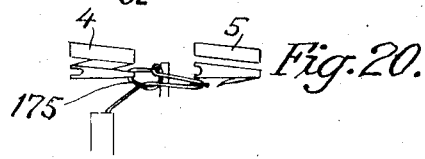

Figs. 13-26 show the sequence of operations incidental to the formation of each new stitch and corresponding to one rotation of the main shaft of the machine. Figs. 13-26 are paired, each alternate view being a view looking on the front of the helical members and the companion view being a plan view. In Figs. 13 and 14 the looper 10 is about to enter the channel 6 in the member 4 the lower point combs having been temporarily removed from the stitches 174, 175 and the respective members, only the upper combs being then engaged with the stitches. In this position the presser 92 is out of action and the yarn layer is urged by the spring into its maximum rearward position. Initial rotation of the main shaft carries the looper 10 through the channel 6 in the member 4 around which channel the old stitch 174 is positioned. All the combs have now engaged the stitches, the yarn layer has commenced to be forced against the pressure of the spring towards the front of the machine and to lay the yarn into a position to overlie the looper hook as clearly shown in Fig. 15. The presser is still out of action. Figs. 17 and 18 show how a new stitch has been initiated by the looper rising through the channel in the member 4 and consequently through the old stitch 174 around such channel, the yarn layer having been pulled forwardly to engage the yarn with the looper and the presser having entered into engagement with the upper row of stitches against the helical members. The combs are still all in engagement with the stitches and no rotation of the helical members has yet occurred. Figs. 19 and 20 show the members after having rotated approximately a half circle, whereby the point of the member 4 has rotated nearly out of engagement with the old stitch 174 through which the new stitch has been inserted, the new stitch having now been stretched across from the guard member to the vicinity of the accepting member and whilst the old stitch has also stretched somewhat. The combs are still all in engagement with the stitches, the yarn layer is still in its most forward position and the presser still in operative position. The new loop is now reaching a position in which further rotation of the accepting member will bring the point of the latter through the said loop and the stitch is then completed. In Figs. 21 and 22 this further rotation has taken place and the new stitch has now been landed on the point of the accepting member and the looper has now moved down sufficiently to discard the new stitch. Figs. 23 and 24 and 25 and 26 show the looper on its return movement the last phase of the cycle being the complete return of the loop from the position shown in Fig. 25 to that shown in Fig. 13 when the cycle is again carried out.

To assist in the positioning of the upper part of the knitted fabric during the stitch formation the bar carrying the comb 110 is provided with a spaced presser cheek 110a which holds the fabric against rising whilst the combs are through the upper row of stitches.

The passage of the looper in the direction through the stich previously described will form a purl stitch but when it is desired to reverse the knitting and to form plain stitches the looper 10 which has been previously operating is now taken out of action and the lower looper 11 is made effective. For this purpose the stops 21 and 24 which have been initiating the downward movements (against the spring 109) of the upper looper through the channel and past the point of the accepting member respectively are now taken out of action and the two further stops 26, 27 (see Fig. 4) introduced which cause the lower looper to pass upwards through the channel and across to the accepting point. For this purpose the slides 22 and 25 are respectively raised and lowered, whereby the new stop 26 on the slide 22 is brought into the path of the lower arm of the lever 20 while the other stop on the slide 22 is moved completely out of the path of such lever whilst the stop 24 on the slide 25 is withdrawn and the new stop 27 introduced into the path of the upper arm of such lever. Extension 178 (see Fig. 4) of the slide 25 carries a toothed sector 179 which is arranged to turn about a fixed shaft 180 projecting from the machine frame and this sector meshes with an elongated toothed pinion 181 pinned to the shank portion 182 of the yarn layer. Therefore depression of the slide 25 causes the sector to rock about its shaft and to turn the yarn layer shank, the full depression of the slide resulting in the yarn layer being turned through a half circle thereby bringing the cranked mouth piece end of the yarn layer (see Figs. 2 and 10) into position above the guard member 4 whereby the lower looper can draw the new yarn downwards through the channel in such member and oscillate under the guard and accepting members and pull the new stitch upwards in a position to receive the ascending point of the accepting member.

The slides 22 and 25 can be operated in any convenient way, manually or automatically, and where automatically operated they may be coupled to a mechanism arranged to be operated by a jacquard mechanism as for example is illustrated in the alternative machine which will be hereinafter described.

The feed of the yarn is controlled by a braking device. The free end of a lever 183 (see Fig. 2) normally presses the yarn against the fixed cross bar 23 of the machine and keeps the yarn taut but when that phase of the cycle is reached when the looper is to draw the new stitch and transfer it over to the accepting point, the braking lever 183 is released by a cam 184 momentarily rocking the lever towards the front of the machine against the action of a spring 185 which normally holds such lever in braking position.

Fig. 11 shows the stitch formation, the last made stitches being indicated by the thick lines, the previous course by the unhatched thread, and the earlier formed course by the hatched thread. The stitch 174 has just been cast off the end of the channelled guard and the new stitch deposited on the accepting member.

It will be observed that whichever of the pointed combs are about to enter the stitches again, does so between the pointed teeth of the other combs and the helical member and in order to facilitate this action the outer and lower edge of the bars carrying the upper blades are chamfered off at 186 (see Fig. 1) to engage the upper inner edge of the centrally gapped cross bar 2 thereby to receive an inward movement when the blades are about to engage the stitches. The lower combs may be also given the slight lateral movement when entering the stitches, by the bars 144 and 145 moving against the cammed edges 187 of bars 138.

The loopers 10 and 11 are normally kept in a neutral position by the two balancing springs 139.

At the rear end of the two members 4, 5, provision is made for successively transferring the new stitches from the accepting member 5 back onto the guard member 4 and this may be achieved, by way of example, by a direct transfer member 300 (see Figs. 8 and 9) which is mounted on a block 301 carrying two projecting pins 302 which are slidable in a block 303 pivoted to the machine frame at 304. Pivoted to the swinging block 303 is a link 305 attached through another link 306 to a lever 307 which co-operates with a cam 308 which periodically rocks the block 303 and with it the transfer member carrying clock 301. To the latter block 301 another link 309 is pivoted and this link at the other end is pivoted to the end of a lever 310 which is fulcrumed on the machine frame at 311 and carries a projection 312 to co-operate with a cam 313 so that the block can be slidden in the pivoted block 303 against the spring 314. The two cams are on the shaft 53 carrying the spur wheel 55. As a result of this mounting of the transfer member 300 it can rock from the accepting member 5 to the guard member 4 and move up and down. Assuming the point of the transfer member to be near the remote part of the accepting member as shown in dotted lines it first swings gently towards the guard member until it lies as shown in full lines against the outer face of one of the blades of the lower comb bar which has travelled beyond the rear end of the accepting member, and which has conveyed with it a stitch. The cams are so shaped that the point of the transfer member now descends through the stitch about the blade of the comb and the stitch is retained in the necking 314' of the transfer member. The mechanism is so timed that the comb in question now descends leaving a stitch on the necking of the transfer member and by virtue of the cam controlled leverages the swinging transfer member now moves further over to the guard member 4 into a position to bring the stitch in the path of the rising point at the rear of the latter.

In the alternative form of machine illustrated in Figs. 27 to 34 the two helical members of the former construction are replaced by two members which have a rotary reciprocating motion and consist of a curved prong construction, there being a series of pointed prongs 253 to each member each prong being partly circumferentially channelled at 254 externally and these prongs may be produced by forming in a solid rod a series of annular recesses 255 leaving central shaft pieces 256 connecting the various discs formed by so recessing the rod and these discs are slotted at 257 in an arcuate manner to form the series of prongs 253 the points of which are designated 258, each disc being partially circumferentially grooved to form the channels 254 about the exterior periphery of each disc. With these curved comb-like members a series of pointed blades 259 are used but as distinguished from the previously described machine instead of there being co-operating pairs of pointed blades of which that one of the pair which is about to enter into the loops always does so between the companion pointed blades and the guard or accepting member 19, there need be in this machine only a single series of pointed blades (see Fig. 31) associated with each blade and an advantage of this form of construction is that the blades can pass through the channels in the prongs and through such stitches as may be thereabout. The prongs in the stationary position have the stitches around the wider part of the prong (see the stitch 260, Fig. 31) and when the prongs rotate in the direction of the arrows from the position shown through a little more than 90°, the point of the prong of the old-stitch carrying member 4 turning towards the stitch eventually leaves the latter which is engaged only with the pointed blade 259 which has been previously brought into the channel. When the pronged member has reached the position in which the flat face 261 thereof is parallel and adjacent the plane in which the blades reciprocate then the pointed blades may be given a longitudinal movement to advance the course of stitches to the extent of at least one stitch. In normal knitting the pointed blades will be advanced one stitch for each new stitch formed.

The pointed blades are shown as of channel section (see Fig. 28) with the channels facing in the reverse direction to the channels in the curved prongs. When each prong has cast off its stitch the pointed blades are displaced sufficiently to bring a stitch thereabout into position to receive the point of the next prong when the rotation of the pronged member is reversed.

A stitch former 200 containing two pairs of looper hooks is provided, one hook only of the four co-operating with the yarn layer 262 at any one time. The pronged members are shown in Fig. 31 in the position in which the channelled end prong of the member 4 has a stitch around it ready to receive a new loop and one looper hook, e. g., the top left hand hook, now descends in a straight vertical path through the channel in such prong and therefore through the stitch 260 which has been placed thereabout and the looper hook in returning through the channel draws a new loop through the channel and such old stitch and when the looper is returned to the position shown the guard member 4 is rotated in the direction of the arrow so that the point of the prong then turns towards the old stitch and eventually releases such stitch. The prong member is not completely rotated but is only turned sufficiently for the point of the guard prong to leave the old stitch and for the flat face 261 to come to a position to free the points for longitudinal displacement, the pointed blades having been previously brought into position alone to support such stitch when the prong releases it. Before the pronged member is turned back again to its original position the series of pointed blades are advanced to the extent of one prong of the pronged member so that when the point of the prong commences to return, it passes through the channelled pointed blade and the stitch thereabout. Another stitch having been taken up by the prong, the reciprocatable blades are now free to rise and move back again and then descend each into the next adjacent prong of the pronged member before or after the looper is again brought down thereby leaving a stitch around the first prong of the pronged member so that the looper hook can again be passed through the channel thereof and another new stitch formed, and also causing each other prong of the pronged member to take up a stitch. The channelling of both the prong members and the pointed blades enables the points of the respective members to be passed freely through the stitch when such stitch is about first one member and then the other. All the loopers are secured to the framework 200 to which is fixed sleeve-like extensions 201 which are rotatable about an inner bearing shaft 202 so that the looper frame can be swung to transfer the new stitch into position to be accepted by the point of the end prong of the companion pronged member after this member has been given a similar part turn in the reverse direction. The thread layer 262 is mounted similarly to the thread layer in the first machine described to lay the thread over the looper hook when this has reached its lowermost position and it similarly has an axial reciprocating movement by attaching to it a slide 203 which is movable to and fro in a guide 204 attached to the bearing shaft 202. For bringing the thread layer to the top of the pronged guard member for cooperation with the lower left hand looper hook the bearing shaft 202 carrying the guide 204 is raised, thereby raising the slide 203 and the thread layer. The guide 204 for the slide 203 is itself slidably mounted in a guide 205. Thus the thread layer can be moved across from the left hand loopers to the right hand loopers (see Fig. 31), the latter movement of the thread layer being necessary when the flow of the knitting is to be reversed and the prong which was previously the accepting member is now the guard member. The two pronged members are made identical for this purpose.

The thread layer is normally urged by spring means towards the loopers (as in the first machine) and is retracted periodically through the medium of a lever 207 (Fig. 27) pivoted at 208 to the framework of the machine and having a projecting arm 209 at the end of which is a lug 210 which is arranged to drop into a cam recess 211 in a cam drum 212 on the main shaft 224 when the thread layer is to be retracted, the motion of the lever 207 permitted by the cam recess 211 causing the free end of the lever 207 to recede from a projection 206 on the slide 204 so that the spring can urge the thread layer forwards during the desired interval of time. To raise the thread layer when one looper is changed over for the other for changing from purl to plain knitting a lever 213 pivoted to the framework is provided, this lever being arranged to raise a block 214 attached to the bearing shaft 202 to which the guide 205 is fixed and motion to the lever 213 is imparted automatically under the control of a jacquard device 215. This device comprises a drum 215a containing a group of circumferentially spaced series of holes and around the drum an endless band is travelled, this band being perforated in accordance with the pattern to be reproduced. The drum is driven intermittently by pawl and ratchet mechanism 216, 217, for example, an advance of one tooth being made with each new stitch formed. With this drum co-operates a series of bars 218 each carrying an end projection 219, these bars being normally urged towards the jacquard drum but only passing into the holes in the drum when a hole in the band permits. Each bar 218 is operatively connected to a mechanism for varying the stitch formation. For raising the thread layer for changing over from plain to purl one of the bars 218, to wit that marked 218a is shown with a cam 220 which is arranged to hold a rod 221 raised so long as the corresponding end projection 219 on the bar 218a does not penetrate the jacquard band. During this time the lever 213 and therefore the thread layer is kept in a raised position. The jacquard drum is sprocket-driven, being rotatably mounted on a long slide 222 which is arranged to be reciprocated once for each turn of the main shaft of the machine by for example the cam 223 mounted to rotate with the main shaft 224. The pawl 217 engages with the ratchet teeth when the slide 222 is permitted to be urged by a spring away from the projections 219. The swinging motion of the looper frame 200 once for each revolution of the main shaft is derived by mounting on the hollow shaft 201 of the looper frame a lever 229. The lever 229 is so keyed to the hollow shaft that the latter can slide axially relatively to the lever and a shoe 230 may be provided to prevent the lever from being carried along in the direction of the axis of the hollow shaft. This lever 229 is provided with a projection 228 which links the lever 229 (see Fig. 28) to a long link 227 which is pivoted at each end to a two armed lever 225, the short arm of the lever having a pin 226 which is engageable with a cam 231 on the main shaft of the machine. The looper can be spring returned from this rocking motion.

For depressing the looper frame to pass the working looper hook through the channel, such frame is provided with a pin 230a which is engaged by the end of a lever 231a (see Fig. 27) which is pivoted at 232, and has a short arm 233 which is engaged by the radial face 234 of a drum on the main shaft 224. If the looper frame 200 is to be raised as is necessary when the lower looper hook is working, the lever 231a must be moved out of the path of the cam surface 234 and another lever 235 which engages a lower projection 236 on the frame 200 shifted into a position in which when the cam drum is rotated another radial surface 237 can come into effect to rock the lever 235. This change over is effected by arranging for the cam drums 238 and 239 carrying the cam surfaces 234 and 237 to be displaceable relatively to each other along the main shaft. This displacement in turn is effected by the Jacquard mechanism the bar 218a having a projection 240 (see Fig. 28) which engages a grooved portion 241 of the cam drum 238 and having also a projection 243 which engages with a grooved portion 242 of the other cam drum 239. Therefore the one bar 218a controls the raising or lowering of the thread-layer and the rising and falling of the looper.

The return of the looper hook out of the channel is achieved by fixing to the hollow shaft 201 a projection 245 (see Fig. 27) which is embraced by a slotted end 244 of a lever 246 which is pivoted at 247 to a fixed part of the machine frame. A flat end 248 of the short arm of such lever in the neutral position of the looper lies against a thrust block 249 which is urged against the lever by springs 250. If the hollow shaft is axially moved in one direction the edge 251 of the flat end of the lever depresses the thrust block and compresses the springs whereas if the hollow shaft slides in the reverse direction the other edge 252 depresses the thrust block so that in either case the springs return the looper frame.

The pronged members are given their rotary reciprocating motion by providing each member with an end pinion which is operated by a segment 265 (Fig. 27) having a toothed faced margin which is connected to link 266 pivoted to lever 267 carrying a projection 268 which is engaged by the surface 269 of a cam 270 (see the left hand side of Fig. 28) periodically to be rocked in one direction, a spring effecting the return motion.

The channeled blade members are carried on a bar 276 for each pronged member and since it is desired that the direction of knitting should be reversed, e. g., for knitting flat, the direction of reciprocation of the respective bars must be capable of reversal. The bar 276 which is attached to a slide 278 (see Figs. 28 and 29) which works in a guide 279 which is secured to a slide rod 280. It may be here interposed that the lifting of the bar 276 (see Fig. 29) is achieved by attaching the slide 278 to a lever 281 operated by the cam surface 285. The return motion is effected by spring action. The bar 276 receives its longitudinal reciprocatory motion by attaching the slide 280 to a cross bar 281a which is provided with a projection 283 which is engaged by slide rod 290 which is urged against a lever 284 by spring 290a, the lever being rocked by a cam surface 282. The slotted connection of the lever 281 to the slide 278 permits the latter to move with the point bars in the longitudinal direction of the latter without any vertical movement of the bars. On the same axis as the lever 284 (see Fig. 28) is another lever 286. The lever 286 effects the return of the bar 276 and is actuated by a cam 287, a slide guided rod 288 turning in the direction of the arrow a lever 289 which, acting on projection 298 causes the member 281a to slide towards the main shaft. A similar mechanism operates the other point bar, the parts being duplicated on the other side of the machine. When the direction of knitting is to be changed the cams 282, 287 are taken out of operation and two further cams 291, 292 are brought into a position to co-operate with the levers 284, 286 respectively, whereby the direction of reciprocation is reversed. This sliding of one pair of cams out of action and bringing the other pair in is derived from another Jacquard bar having a projection 293. Since the rocking motion of the looper must then also be reversed the drum which carries cams 282, 287, 291, 292 is arranged to be clutched to a drum 296 which carries the cam 231 and simultaneously with this clutching the cam drum on the other side of the machine which operates the companion link 227 is declutched from the counterpart multiple cam drum on that side of the machine.

The thread layer must be displaced to co-operate with the other looper hooks and for this purpose (see Fig. 30) the Jacquard bar 218b carrying the projection 293 is arranged to rock lever 401 against which the rod 402 which bears on slide 293, a spring 403 serving to return the slide when permitted by the Jacquard control.

For nipping the fabric whilst the point bars are traversing the stitches we provide a plate 300a to each pronged member, such part being carried by the corresponding point blade carrying bar and is moved therewith and co-operating with such plate is a further plate 301a (see Fig. 29) which is carried by a plunger 302a normally urged upwards by a spring 303a. The plate 301a is attached to the same frame 281a as the plate 300a so that the two plates reciprocate together. The fabric is nipped between the meeting edges of the plates.

In the machines hereinbefore described we have described a transfer member for transferring the stitches from the rear end of the accepting member onto the rear end of the guard member so that the stitches are formed in a continuous spiral manner. It is obvious that the guard and accepting members can be of any desired length and it is not essential that the accepting member should be a rotary member because for example, rows of pointed members such as we have herein described can be used for conveying the stitches but where necessary they can be associated with means for bringing the loops back onto the guard member. In Figs. 35 and 36 we have shown schematically a form of apparatus in which the desired length of the knitted courses can be chosen without use of unduly long members. In this arrangement we employ two pairs of co-axial members 370, 371, 372, 373 which for convenience we have shown of the comb form (as in Figs. 33 and 34) and between each of the co-axial members forming a pair we provide for the passage of a series of separate stitch conveying pointed members (which we term conveyor points). It is advantageous to make these conveying points a part of an endless system of points, the one reach of the endless system passing between the members 370, 371 of one pair and the other reach passing between the members 372, 373 of the other pair and reserve members may be introduced for wider fabric or fabrics of greater circumference by further separating the members 370 and 371 or 372 or 373. Diagrammatically we have indicated two separating members 400 and 401 for carrying the members 370 and 372, and 371 and 373 respectively. In order that the points shall not interfere with or be obstructed by the pronged members or other parts of the apparatus, the system is so arranged that the points which are actually to convey the stitches between the co-axial pronged members are periodically raised from the endless channel into line with the pronged member and lowered therefrom. This endless system of intermittently moved points 374 works in an endless channel 375 having suitable sloping portions 376 which lead the conveyor points to and from a raised part 377 of the track along which they can move between the pronged members. The conveyor points are conveniently of channel section as also are the pointed members 259 attached to the bars 276 which as in the forms shown in Figs. 27–34 are attached to slides 278 which work in guides 279 secured to rods 280. The conveyor points 374 fit closely within the channel section of the pointed members 259. The conveyor points are so arranged as to be lifted in succession into the last pointed member of the bar 276 associated with the accepting member so that as the final stitch on such bar is brought from the accepting member to the conveyor points one point 374a of such points rises into the channel of the last pointed member 259a. The conveyor point 374b of the raised horizontal row which lies nearest to the rear end of the co-axial guard member simultaneously receives the rear pointed prong 374c of the such member which therefore passes through the stitch on that end conveyor point. The pointed member 374b now descends. The bars carrying pointed members 259 now rise out of the stitches and are retracted and the members lowered into the next adjacent stitches. The bars then return and the conveyor points are advanced one step forward.

The sloping portions of the track communicate with the horizontal upper section of the track by way of vertical passages 378 and when a conveyor point has been raised to the top of the inclined track a pusher 379 actuated by a cam-operated lever 380 lifts the conveyor point up the vertical passage into a position in which it can be displaced along the horizontal upper section of the track and similarly a depressing member 381 is provided for lowering the conveyor point at the other end of the horizontal track down the vertical passage onto the descending section of the track. The cam 382 operating the linkage 383 serves to lower the depresser.

The stitches thus travel along the endless track, knitting taking place at one station (see Fig. 35), e. g., from 373 to 371 and at the second station from 370 to 372, a looper frame 200 being indicated at each station.

The guard and accepting members may have an axial rod or tubular or like extension along which the stitches may pass. The extension may be of reduced diameter to enable the stitches to be slackly supported thereon. The helix may also be reduced in thickness in the neighbourhood of the gear teeth, e. g., by increasing the bore of the helical needle at that region.

Although the guard and accepting member have been shown parallel to each other, this is by no means essential, neither is it essential that the stitches should be disposed horizontally of the needles.

In the mode of knitting successively, the stitches are knitted from one member to the other as in hand knitting, the stitches of a succeeding row being passed through the stitches of the preceding row onto the other accepting member with the old stitches now cast off from the companion member and hanging down from the newly formed stitches.

It will be apparent that we can produce circular knitting and at suitable times alter the flow of the knitting by suitably controlling the flow of the knitting clock-wise and anti-clockwise so that flat portions may be formed either in the first instance or after a portion of circular knitting has been formed.

It will readily be seen that as the yarn is passed from stitch to stitch, so each stitch becomes attached to the preceding stitch; if there is now considered a number of stitches in circular formation it will be obvious that the fabric thus formed is in reality, a continuous row of stitches in a spiral formation, so that upon reaching a predetermined stitch at some period of the formation of the fabric, the flow of the knitting may be reversed.

Instead therefore of a succeeding stitch being formed to its predecessor, the next stitch to be formed will be through the last stitch which has been formed and taken upon the accepting member which has now become the guard member needle in virtue of the now changed flow of knitting.

In effect one stitch has now been formed through the last formed stitch, and it is now possible to knit back to the stitch which would have been next knitted, had the flow not been altered; again the flow is altered, therefore, as the yarn does not pass over to the stitch which would next have been knitted in both cases of the altered flow, these two stitches have no yarn connecting them, and therefore an opening is formed by this altered directional knitting. Such opening formations may be produced in any of the forms of the invention herein described.

Where tandem pairs of knitting points are provided, two openings may be made by passing half the stitches through each knitting end.

The guard member may carry only a single stitch at a time or only two or more stitches superimposed, e. g., by providing the guard in the form of a single separate channelled prong and advancing the stitches by a series of points 374.

The present invention enables each stitch to be formed separately and when formed to be placed close to the preceding loop and the size of the loop need not unless desired, be substantially larger than is necessary for a double thickness of yarn which is to be passed through it as the next loop.

The hooked end of the looper may be split longitudinally and automatic means provided for spreading such split portion to open the loop for facilitating the passage of the looper and newly formed loop therethrough.

What we claim is:

1. A knitting machine comprising a guard means adapted to hold open and guard a stitch therearound and having at least that part thereof around which the stitch is held of open structure, thread-engaging means, means for operating said thread-engaging means so as to cause said latter means in the formation of each stitch first to engage the thread and then to loop it through the old stitch whilst this is held open and protected by the guard means, said guard means being constructed to permit the lateral release of the new loop and means for accepting said loop.

2. A knitting machine comprising a guard means adapted to hold open and guard a stitch therearound and having at least that part thereof around which the stitch is held of open structure, means co-operatable with said open part of the guard means, means for operating said guard co-operating means to cause said latter means in the formation of a stitch, first to pass through the old stitch whilst this is held open and protected by the guard means to engage the thread and then to draw a loop back through said old stitch, said guard means being constructed to permit the lateral release of the new loop and means for accepting said loop.

3. A knitting machine comprising a means adapted to hold open and guard a stitch therearound and having at least that part thereof around which the stitch is held of open structure, means operative in the formation of each stitch first to engage the thread and then to loop it through the old stitch whilst this is held open and protected by the guard means, means for controlling the thread engaging and looping means to permit said means to loop the thread through said old stitch selectively in either direction, said guard means being constructed to permit the lateral release of the new loop and means for accepting said loop.

4. A knitting machine comprising a channeled guard means adapted to hold open and guard a stitch therearound, means adapted to engage said channeled guard and pass through the stitch therearound, means for operating said stitch-penetrating means so as to cause said latter means in the formation of each stitch first to engage the thread and then to loop it through the channel and the old stitch, said guard means being constructed to permit the lateral release of the new loop and means for accepting said loop.

5. A knitting machine comprising a stitch-forming means, a channeled means adapted to hold open and guard a stitch therearound, and a means to actuate said stitch-forming means to enable the latter to form a stitch by first passing through the channel of the stitch guarding means to engage the thread and then returning therethrough whilst drawing a new loop through the channel and old stitch whilst this is held open and guarded thereby.

6. A knitting machine comprising a hooked member and a laterally open guard member adapted to hold open a stitch therearound and means for moving said hooked member first through the guard member and a stitch thereabout to engage the thread and then back through the guard and stitch whilst the hooked member is drawing a loop of the thread.

7. A knitting machine according to claim 6, in which said laterally open guard member is of channel form.

8. A knitting machine comprising a means adapted to hold open and guard a stitch therearound in combination with a thread-engaging hooked means and a stitch-accepting means, said stitch guarding means having at least that part thereof around which the stitch is held of open structure to permit the passage therethrough of the hooked means and the lateral release of the new stitch for acceptance by said accepting means, means for actuating said hooked means to form a stitch by first passing said means through said open part to receive the thread about the hook and then returning with the loop drawn by the hook through said open part and the old stitch held open thereby, said stitch-guarding means having at least two walls which define the opening and which are arranged to be spanned by the thread of the stitch which is held open thereby and said hooked means being adapted to pass through said stitch with its free end facing one of said walls.

9. A knitting apparatus comprising a stitch-guarding element having at least one part channeled or slotted where it is to hold open and guard a stitch therearound, a hooked thread-engaging member, means for operating said member to enable it to engage the thread and carry a new loop through such part, and a member for accepting the new loop.

10. A knitting machine comprising a laterally-open stitch-forming member which remains open while passing through the old stitch, a guard which protects the old stitch from such member while this is passing through such stitch, means for operating the stitch-forming member and a member for accepting the new stitch.

11. A knitting machine comprising a permanently open hook, means for actuating said hook to enable it to carry the new loop through the old stitch, a guard which protects the old stitch from the hook while this is passing through such stitch, and a member for accepting the new loop from the hook.

12. A knitting machine comprising a guard means adapted to hold open and guard a stitch therearound and having at least that part thereof around which the stitch is held of open structure, thread-engaging means, means for operating said thread-engaging means so as to cause said latter means in the formation of each stitch first to engage the thread and then to loop it through the old stitch whilst this is held open and protected by the guard means, said guard means being constructed to permit the lateral release of the new loop and means for accepting said loop, both said guard means and said accepting means being operative at one time as a stitch guard and another time as a stitch acceptor.

13. A knitting machine comprising means to hold a series of stitches and a stitch forming means, means for relatively displacing said series and said stitch forming means to enable the stitch forming means to co-operate successively with stitches of said series, means for operating said stitch-forming means so as to cause said means in the formation of each of successive stitches first to engage the thread and then to loop it through the stitch of the series with which it is co-operating and means permitting said stitch-forming means so to form a loop in either direction selectively through the stitches of the series.

14. A knitting machine adapted to produce flat knitting comprising a means adapted to hold open a stitch therearound in combination with a stitch forming means adapted to form stitches of a row in succession, said stitch-holding means having at least that part thereof around which the stitch is held of open structure to permit the passage therethrough of the stitch-forming means and the lateral release of the new stitch, said stitch-forming means being operative to form each stitch by first engaging the thread and then carrying the loop of the new stitch through the old stitch whilst this is held open and guarded from the stitch-forming means by said open part, means for reversing the direction in which the stitches of the row are formed, and means for reversing the action of said stitch-forming means according to the direction in which the stitches are formed.

15. A knitting machine comprising a means adapted to hold open a stitch therearound in combination with a stitch-forming means, said stitch-holding means having at least that part thereof around which the stitch is held of open structure to permit the passage therethrough of the stitch-forming means and the lateral release of the new stitch, and stitch-forming means being operatable to pass through said open part selectively in either direction to form a stitch by first engaging the thread and then carrying the loop of the new stitch through the old stitch whilst this is held open and guarded and means for automatically changing the direction in which the stitch-forming means carries the loop through said open part.

16. A knitting machine adapted to produce flat knitting comprising a means adapted to hold open a stitch therearound in combination with a stitch forming means adapted to form stitches of a row in succession, said stitch-holding means having at least that part thereof around which the stitch is held of open structure to permit the passage therethrough of the stitch-forming means and the lateral release of the new stitch, said stitch-forming means being operative to form each stitch by first engaging the thread and then carrying the loop of the new stitch through the old stitch whilst this is held open and guarded from the stitch-forming means by said open part, means for automatically reversing the direction in which the stitches of the row are formed, and means for automatically reversing the action of said stitch-forming means according to the direction in which the stitches are formed.

17. A knitting machine comprising a means adapted to hold open a stitch therearound in in combination with a stitch-forming means, and a thread-laying means, said stitch holding means having at least that part thereof around which the stitch is held of open structure to permit the passage therethrough of the stitch-forming means and the lateral release of the new stitch, said thread-laying means and said stitch-forming means being co-operatively related to enable the latter to form each stitch by first engaging the thread and then carrying the new loop through the old stitch whilst this is held open and guarded.

18. A knitting machine comprising a means adapted to hold open a stitch therearound in combination with a hooked stitch-forming means and a thread-laying means, said stitch holding means having at least that part thereof around which the stitch is held of open structure to permit the passage therethrough of the stitch-forming means and the lateral release of the new stitch, said hooked stitch-forming means and said thread-laying means being co-operatively related so that the stitch-former forms a stitch by first passing through the open part of the stitch holder whereupon the said thread-layer lays the thread about the hook and then returning through said open part whilst drawing the new loop through the old stitch whilst this is held open.

19. A knitting machine comprising a means adapted to hold open a stitch therearound in combination with a stitch-forming means, and a thread laying means, said stitch holding means having at least that part thereof around which the stitch is held of open structure to permit the passage therethrough of the stitch-forming means and the lateral release of the new stitch, said stitch-forming means being operatable to pass through said open part selectively in either direction to form a stitch by first engaging the thread and then carrying the new loop through the old stitch whilst this is held open and said thread laying means being displaceable so as to lay the thread in operative relationship to the stitch former in whichever direction the latter carries the new loop through said open part.

20. A knitting machine as in claim 19, in which said stitch-forming means comprises two stitch-forming elements one of said elements being arranged to carry a new loop through the open part of the stitch holder in one direction and the other of said elements being arranged to carry a new loop through said open part in the reverse direction.

21. A knitting machine according to claim 14, in which said stitch-forming means comprises four stitch-forming elements, two of said elements being operative in one direction of forming the stitches and two in the other direction of forming the stitches, one of each pair being arranged to carry the loop through a corresponding open part in one direction and the other in the reverse direction.

22. A knitting machine comprising a stitch-forming means and means for bringing the stitches successively into loop-receiving relation thereto, said latter means including at least one member having a part thereof around which the stitch is held open for receiving a new loop, such part being of open structure to permit the passage therethrough of the stitch-forming means and the lateral release of the new stitch, and said stitch-forming means being operative to form each stitch by first engaging the thread and then carrying the loop of the new stitch through the old stitch whilst this is held open and guarded from the stitch-forming means by said open part.

23. A knitting machine according to claim 22 in which said means for bringing the stitches successively into loop-receiving position comprise a series of members each accepting a new stitch in turn and being in the form of separate members each adapted to convey a stitch.

24. A knitting machine according to claim 22, in which said means for bringing the stitches successively into loop-receiving position comprise a series of stitch-conveying members each having a part of open structure to hold open a stitch therearound.

25. A knitting machine according to claim 22, in which said means for bringing the stitches successively into loop-receiving position comprise a series of stitch-conveying members arranged in an endless series, said members each being channelled to hold open a stitch therearound.

26. A knitting machine comprising a means adapted to hold open a stitch therearound in combination with a stitch-forming means, said stitch-holding means having at least that part thereof around which the stitch is held of open structure to permit the passage therethrough of the stitch-forming means and the lateral release of the new stitch, and said stitch forming means being operative to form each stitch by first engaging the thread and then carrying the loop of the new stitch through the old stitch whilst this is held open and guarded from the stitch-forming means by said open part, and means for feeding the new stitches into a position in which they successively come into the same position as that of the stitch through which the new stitch was formed so as in turn to have a new stitch formed therethrough.

27. A knitting machine according to claim 22, in which the stitches are fed in one direction only.

28. A knitted machine according to claim 22, in which the stitches are fed first in one direction and then in the opposite direction.

29. A knitting machine according to claim 22, having means for feeding the stitches selectively in one direction only for the formation of tubular knitting or first in one direction and then in the opposite direction for flat knitting.

30. A knitting machine comprising at least two stitch-forming means at different stations and capable of knitting substantially at the same time, means for bringing the stitches which are still to receive a new stitch successively into loop-receiving relation thereto, and said latter means including means co-operative with each such stitch-forming means for holding an old stitch open during the forming of the new stitch, said holding means having at least that part thereof around which the stitch is held of open structure to permit the passage therethrough of the stitch-forming means and the lateral release of the new stitch and said stitch-forming means being operative to form each stitch by first engaging the thread and then carrying the loop of the new stitch through the old stitch whilst this is held open and guarded from the stitch-forming means by said open part, whereby at least two stitches may be formed at substantially the same time.

31. A knitting machine according to claim 30, in which the stitch-forming means at each station is adapted selectively to carry a new loop in either direction through the open part holding the stitch.

32. A knitting machine comprising a stitch-forming means and means for feeding the stitches successively into loop receiving relation thereto, said latter means including at least one member having at least one part thereof around which the stitch is held open, such part being of open structure to permit the passage therethrough of the stitch-forming means and the lateral release of the new stitch and said stitch-forming means being operative to form each stitch by first engaging the thread and then carrying the new loop of the new stitch through the old stitch whilst this is held open and guarded from the stitch-forming means by said open part, said feeding means comprising an endless series of stitch-carrying travelling members, only a given number of said members acting as stitch carriers at any one time and that number of members being arranged to travel at a higher level than those which are temporarily without a stitch, means for successively lifting the travelling members from a lower part of the endless system into engagement with a new stitch and means for successively lowering the travelling members out of a stitch at another position along the endless system of members after the stitch carried therearound has been removed therefrom.

33. A knitting machine according to claim 30, comprising an endless series of travelling stitch conveying members for conveying the stitches formed at one station successively to new loop receiving relation to the stitch forming means at the other station, only a given number of said members divided into two series acting as stitch carriers at any one time and that number of members being arranged to travel at a higher level than those which are temporarily without a stitch, means for successively lifting the travelling members at two positions from a lower part of the endless system into engagement with a new stitch and means for successively lowering the conveying members out of a stitch at two other positions along the endless system of members after the corresponding stitches carried therearound have been removed therefrom.

34. A knitting machine according to claim 17 in which the thread layer is displaceable to open out the loop when the loop is on the stitch-forming member so as to facilitate the entry of the accepting member through such loop.

35. A knitting machine comprising means to hold a series of stitches, stitch-forming means, means for operating said stitch-forming means for forming new loops successively through the stitches of said series in either direction for plain or purl formation as desired, said latter means causing the stitch forming means in the formation of each of successive stitches first to engage the thread and then to loop it through the stitch of the series with which it is co-operating, stitch guard means for holding open and guarding each stitch of said series while the new loop is being formed therethrough and means for transferring the new loops from the stitch-forming means to the holding and guard means in turn as new stitches to be held open and guarded and penetrated by the stitch forming means, means for releasing the stitches from the guard means after new loops have been formed therethrough, and a Jacquard controlled mechanism for periodically reversing the direction in which said stitch forming means form the new loops through the guarded stitches.

36. A knitting machine according to claim 14, having a Jacquarding mechanism for automatically controlling reversal of the knitting flow.

37. A knitting machine as in claim 1, having two members each comprising a guard part of open structure to hold open a stitch therearound and each having a new-loop accepting end so that either of said members may be selectively used to hold open the stitch while the other member accepts the new loop.

38. A knitting machine as in claim 22, having a series of pointed stick-like travelling members each adapted to hold open a stitch thereon, and means for displacing said members in order progressively to advance the stitches.

39. A knitting machine according to claim 22, having a series of pointed stick-like travelling members each having at least one part of open structure so as to be capable of holding open a stitch therearound, means for displacing said members in order progressively to advance the stitches, and means for varying the number of pointed members which are to be operative and thereby the number of stitches knitted before the new stitch returns to the position in which it was formed to receive a new loop.

40. A knitting machine according to claim 30, comprising an endless series of stick-like stitch conveying members each having at least one part of open structure so as to be capable of holding open a stitch thereabout, means for displacing said members in order progressively to advance the stitches, means for dividing said members into two equal series separated by the knitting stations and means for increasing or decreasing equally the number of members in the two series.

41. A knitting means as in claim 1, having a braking device for maintaining the thread under tension and means for releasing the brake when the new stitch is being formed.

42. A knitting machine as in claim 1, having a presser device arranged to be periodically operated to apply pressure on the fabric to hold this stationary whilst the new loop is being passed over or under the presser from the guard means to the accepting means.

43. A knitting machine according to claim 3, comprising a means for determining the stitch formation, said stitch-forming means being operatively related thereto and the direction in which the stitch-forming means passes through said open part being automatically controlled by said determining means, said thread-laying means being also operatively connected to said determining means and the position of said thread-laying means being automatically changed when the stitch-forming means is operated to change the direction in which it is to pass through the open part.

44. A knitting machine according to claim 1, in which the stitch-guard means is adapted to turn about an axis and said thread engaging means is arranged to form each stitch by first engaging the thread and then carrying the new loop by a substantially tangential movement through the open part of said stitch-guard and the stitch thereabout.

45. A knitting machine comprising a pair of members each having a part with an open structure to hold open a stitch therearound, a stitch-forming means adapted to co-operate with either of said members selectively, means for conveying the stitches to bring them successively to the stitch-opening member, for the time being in operation and means for reversing the direction of the stitches when the second stitch-opening member is brought into use.

46. A knitting machine according to claim 45, having means for automatically reversing the direction of traverse of the stitches when the second stitch-holding member is brought into use.

47. A knitting machine according to claim 1, comprising a stitch-guard member adapted to turn about an axis and being peripherally channeled or slotted to hold open a stitch therearound, means for bringing the stitches successively to said channeled means, said thread-engaging means being arranged to form each stitch by first engaging the thread and then carrying the new loop by a substantially tangential movement through the channel and the stitch thereabout.

48. A knitting machine as in claim 14, in combination with a thread-layer, said thread-layer being displaceable into co-operative relationship with the stitch-forming means when the direction of flow is reversed.

49. A knitting machine comprising a pair of members each having a part of open structure to hold open a stitch therearound, a stitch-forming means adapted selectively to pass in either direction through either of said stitch-opening parts to carry a loop therethrough means for conveying the stitches to bring them successively to the stitch-holding members for the time being in operation and means for reversing the direction of traverse of the stitches when the second stitch-holding member is brought into use.

50. A knitting machine as in claim 49 having a thread-laying means, said thread-laying means being displaceable so as to lay the thread in operative relationship to the stitch-former in whichever direction the latter carries the new loop through the stitch holder and whichever stitch holder is for the time being in operation, means for conveying the stitches to bring them successively about the stitch-holding part for the time being in operation and means for reversing the direction of traverse of the stitches when the second stitch-holding part is brought into use.

51. A knitting machine comprising a stitch-forming element, an element having at least one part of open structure adapted to hold open a stitch therearound and a series of stitch-conveying elements for conveying the stitches back to said stitch-holding element, said stitch-conveying elements being each adapted to hold open a stitch thereabout, said stitch-holding element being arranged to enter said conveying element to receive a stitch held open thereabout and said stitch-forming element being arranged to form each stitch by first engaging the thread and then carrying the new loop through the old stitch whilst this is held open by the stitch-holding element.

52. A knitting machine according to claim 1, having a stitch-guard member in the form of an oscillatable curved prong having a peripheral groove or opening for the passage substantially tangentially of the thread-engaging member.

53. A knitting machine according to claim 1, having a series of oscillatable prongs, at least one of which is provided with a peripherally grooved or slotted part for holding open and guarding a stitch and permitting the passage substantially tangentially of the thread-engaging member.

54. A knitting machine according to claim 1, comprising a rotatable stitch-guard member of helical form having a peripherally grooved or slotted part for holding open and guarding the stitch and permitting the passage in a generally tangential path of the thread-engaging member.

55. A knitting machine according to claim 22, in which the stiches are brought into new loop receiving position by a series of channeled stitch-conveying members and an oscillatable stitch-holding member of curved prong form mounted so that its point intrudes into a channeled conveyor member when removing the stitch therefrom, said prong member being shaped so that during its oscillatory motion it becomes free to allow the channeled members to move without interference thereby.

56. A knitting machine according to claim 22, comprising a series of stitch-conveying members and a member movable relatively thereto for bringing the stitches successively into knitting relation to the stitch-forming means, said stitch-conveying members having a part of open structure for holding open the stitch thereabout and said relatively movable member having a part of open structure for holding open a stitch therearound, said latter member being adapted to receive stitches successively from said conveyor members.

57. A knitting machine as in claim 45, comprising two helical stitch-holding members rotatable in opposite directions, the one through which for the time being the loops are being carried being arranged to cast the old stitches off one pointed end while the pointed end of the other helical part moves into engagement with the new loop.

58. A knitting machine as in claim 1, in which the stitch-guard means is arranged to be held stationary while the thread-engaging means are passing therethrough to form the new loop and then to be rotated to cast off the stitch which was previously around the guard.

59. A knitting machine as in claim 11, in which the guard has at least one part channeled and in which said hook is disposed so as to be directed towards the bottom of the channel during the passage of the hook through the latter.

60. A knitting machine as in claim 45, in which there are two rotary or oscillatable stitch-holding members arranged substantially in parallelism and each provided with a part of open structure adapted to hold open a stitch therearound and a loop receiving point and so arranged that the new loop may be passed through the open part in one onto the receiving point of the other and thence to means which transfer the stitch which that loop helps to form to the first member.

61. A knitting machine according to claim 1, in which said guard means and said new loop accepting means each comprises a member adapted to hold a row of stitches, the guard member having a guard part of open structure at one end and said accepting member being adapted to accept the new loop carried through such open part, means for bringing the stitches on said guard member successively to said guard part and for taking the new loops successively to the rear of said accepting member, and means for transferring the stitches from the rear of said accepting member to the rear of the first member.

62. A knitting machine as in claim 1, in which said guard means and said new loop accepting means each comprise a member adapted to hold a row of stitches, the guard member having a guard part of open structure at one end and said accepting member being adapted to accept the new loop carried through such open part, means for bringing the stitches on said guard member successively to said guard part and for taking said new loops successively to the rear of said accepting member, and a stitch-engaging transfer member having a tapered point-end behind which the stitch can be retained on the transfer member, means being provided for displacing said transfer member between the rear ends of the accepting and guard members to bring the stitch on to the rear end of the stitch guard member.

63. A knitting machine comprising a stitch-forming means, a member adapted to hold open the stitches successively for the reception of the stitch-forming means, said stitch-forming means being arranged to form each stitch by first engaging the thread and then carrying the new loop through the old stitch whilst this is held open, a new loop accepting member, at least one of said members being adapted to hold a row of stitches, and a row of point members adapted to engage the stitches on said member and to feed the row intermittently.

64. A knitting machine as in claim 63, in which the member which carries the row of stitches is of helical form and in which the pointed members are arranged to enter a row of stitches near the external surface of the helical member and are movable intermittently in timed relationship with the rotation of the helical member through a distance equal to the pitch of the helix so as to facilitate the advance of the loops along the helical member.

65. A knitting machine comprising a stitch-forming means and a helical member adapted to hold open the stitches successively, said stitch-forming means being arranged to form each stitch by first engaging the thread and then carrying the new loop through the old stitch whilst this is held open, a helical new-loop accepting member and a row of point members adapted to engage the stitches on each helical member, said point members being intermittently movable by a distance equal to the pitch of the helix in order to feed one row towards the stitch supporting station and to feed the other row away from the receiving point.

66. A knitting machine comprising a stitch-forming means, a member adapted to hold open the stitches successively for the reception of the stitch-forming means, said stitch-forming means being arranged to form each stitch by first engaging the thread and then carrying the new loop through the old stitch whilst this is held open, a new loop-accepting member, at least one of said members having a series of elements each adapted to hold a stitch, a row of pointed members adapted to engage the stitches held on said latter member, said latter member being adapted to turn so that the elements detach themselves from the stitches and said pointed members being arranged so to feed the stitches as to enable the said elements when turned back to engage another stitch.

67. A knitting machine comprising a stitch-forming means, a member adapted to support and hold open the stitches successively for the reception of the stitch-forming means, said stitch-forming means being arranged to form each stitch by first engaging the thread and then carrying the new loop through the old stitch whilst this is held open, a new loop accepting member, at least one of said members having a series of elements each adapted to hold a stitch, a row of channeled pointed members adapted to engage the stitches held on said member, said stitch-holding member being adapted to turn so that the elements detach themselves from the stitches and said pointed member being arranged so to feed the stitches as to enable the said elements when turned back each to engage another stitch, said elements being pointed and arranged to enter the channel in the pointed member when engaging a new stitch.

68. A knitting machine as in claim 63, in which co-operating pointed members are arranged to enter the stitches of the row from opposite sides and to retain such stitches in order to counter tendency for the fabric to wind or roll up on the member which carries the row.

69. A knitting machine comprising a stitch-forming means, a member adapted to hold open the stitches and to receive the stitch-forming means, said stitch-forming means being arranged to form each stitch by first engaging the thread and then carrying the new loop through the old stitch whilst this is held open, a new-loop accepting member, at least one of said members having a series of elements each adapted to hold a stitch, a row of blades adapted to engage the stitches held on said member, said holding-member being adapted to turn so that the elements detach themselves from the stitches and said blades being arranged in two co-operating series which periodically simultaneously lie through a row of stitches and move together to advance the loops, one series being arranged to enter the stitches from one side and the other series from the other side, the two series being withdrawn from the stitches in succession in such a way that the second series is not withdrawn until the first series has been again engaged with the stitches, both series reciprocating in the direction of the row of stitches so that one stitch is cast off the points and a new one is engaged thereby with each complete cycle of operation of the blades, and means causing the blades entering the stitches to do so between a blade of the companion series and the row-carrying member.

70. A knitting machine as in claim 69, in which both said stitch-holding member and said loop-accepting member are arranged to hold a row of loops and two series of blades are associated with each member, means being provided for reversely reciprocating the two series associated with one member in relation to the series appertaining to the other member so that the stitches progress in opposite directions along the respective members.

71. A knitting machine comprising a stitch-forming means, a member adapted to hold open the stitches successively for the reception of the stitch-forming means, said stitch-forming means being arranged to form each stitch by first engaging the thread and then carrying the new loop through the old stitch whilst this is held open, a new loop accepting member, at least one of said members being of helical form and mounted rotatably, and tooth gearing for rotating said member including teeth formed externally of said helical member acroass its convolutions.

72. A knitting machine comprising a stitch-forming means a member adapted to hold open the stitches successively for the reception of the stitch-forming means, said stitch-forming means being arranged to form each stitch by first engaging the thread and then carrying the new loop through the old stitch whilst this is held open, a new loop accepting member, at least one of said members being of helical form and mounted rotatably, a recess in the outer periphery of said helical member across the convolutions, and a bearing collar intruding into said recess for supporting the helical member and taking the end thrust thereof.

73. A knitting machine according to claim 1, in which said guard and accepting means comprise parallel pairs of aligned but spaced stitch guard and stitch accepting members and a series of stitch-engaging conveyor members for supporting and progressively advancing the stitches between the members of each pair, and means for transferring the stitches from the rear member of one pair to the rear memebr of the other or alternatively for knitting from one such rear member to the other so as to produce tubular knitting with a considerably greater number of stitches than can be supported by the members.

74. A knitting machine as in claim 1, in which said guard and accepting means comprise a stitch-guard member for carrying a row of stitches and a stitch-accepting member for carrying a row of stitches and in which the front end of the guard member and the rear end of the accepting member are channeled to hold open a stitch therearound and the front end of the accepting member and the rear end of the guard member are provided with accepting points, and thread-engaging means are provided at each end of the members to provide two stitch-forming stations.

75. A knitting machine as in claim 1, in which said guard means comprise two stitch-guard members selectively usable as stitch-accepting members, each adapted to carry a row of loops and each provided at each end with a channeled part adapted to hold open a stitch therearound and with a point to accept a new stitch.

76. A knitting machine as in claim 1, in which said guard and accepting means comprise a member with at least a part of open structure adapted to hold open a stitch therearound and a new-stitch accepting member, at least one of said members being rotatably mounted, gearing for rotating said member, crank means for operating said gearing and a step-by-step mechanism for operating said crank means to impart an intermittent rotary movement to said member.

77. A knitting machine comprising an oscillatable stitch-forming means, a guard member having a part of open structure to hold open a stitch therearound, a member which accepts the new stitch, said stitch-forming means being displaceable parallel to the axis of oscillation, and means for moving the stitch-forming means suddenly through the open part and back to engage the thread and loop it through the old stitch whilst this is held open and guarded by said guard member and means for moving the stitch-forming member in a direction parallel to the axis of oscillation while conveying the new stitch to the accepting member.

78. A knitting machine according to claim 1, in which said guard means comprise a member having a series of curved prongs each adapted to carry a stitch and each externally circumferentially channeled so as to be capable of holding open a stitch therearound, said thread engaging means being adapted to move through the channel of one of said prongs to carry a new loop therethrough, and a series of stitch-advancing members adapted to engage the stitches held on said prongs, means for partly rotating said prongs to detach the stitches therefrom, means to displace the stitch-advancing members when the prongs have been so shifted, and means to return said prongs into engagement with other stitches after the advance of the stitches has taken place.

79. A knitting machine according to claim 1, in which said guard means comprise a rotatable stitch-holding members of helical form having a peripherally grooved or slotted part for holding open and guarding the stitch and permitting the passage in a generally tangential path of the thread-engaging means, and means for rotating said helical member intermittently.

80. The method of knitting which consists in engaging the thread by a thread engaging member, carrying a new loop thereby through a guard member around which the old stitch is held, transferring the new loop from the thread engaging member to a new loop accepting member, releasing the thread from the thread engaging member and re-engaging it to form the next stitch in the same way.

81. The method of knitting according to claim 80, in which after an initial series of stitches have been formed in any convenient way the stitches are formed successively.

82. The method according to claim 80 in which after an initial series of stitches have been formed in any convenient way the stitches are produced two at a time, but so that there are always a number of already-formed stitches awaiting their turn to receive, whilst the other of the stitches are receiving, a new stitch.

HERBERT NOEL SMITH.
ELIZABETH ETHEL SMITH.